United States Patent
Sarma et al.

(10) Patent No.: US 12,244,717 B1
(45) Date of Patent: Mar. 4, 2025

(54) PROCESSING ACCESS REQUESTS ON A SERVICE-TO-SERVICE BASIS USING A THIRD-PARTY IDENTIFICATION TOKEN

(71) Applicant: Chime Financial, Inc., San Francisco, CA (US)

(72) Inventors: Mukund Sarma, San Francisco, CA (US); Afaaq Alam Patel, Burnaby (CA); Robert Morris, Jr., Crystal Lake, IL (US); Arkadiy Tetelman, San Francisco, CA (US); Jeffrey Trudeau, Concord, CA (US); Paul Michael Kuliniewicz, Monee, IL (US)

(73) Assignee: Chime Financial, Inc., San Francisco, CA (US)

( * ) Notice: Subject to any disclaimer, the term of this patent is extended or adjusted under 35 U.S.C. 154(b) by 0 days.

(21) Appl. No.: 18/677,595

(22) Filed: May 29, 2024

(51) Int. Cl.
*H04L 9/32* (2006.01)
*H04L 9/40* (2022.01)

(52) U.S. Cl.
CPC .......... *H04L 9/3213* (2013.01); *H04L 63/101* (2013.01)

(58) Field of Classification Search
CPC ...... H04L 9/321; H04L 9/3213; H04L 63/101
See application file for complete search history.

(56) References Cited

U.S. PATENT DOCUMENTS

| | | | | |
|---|---|---|---|---|
| 10,880,087 B2 * | 12/2020 | Martynov | ................ | G06F 9/547 |
| 11,146,564 B1 * | 10/2021 | Ankam | ................ | H04L 63/102 |
| 11,310,059 B2 * | 4/2022 | Leibmann | ............. | H04L 9/0894 |
| 11,954,238 B1 * | 4/2024 | Tan | ........................ | H04L 9/0891 |
| 2015/0317613 A1 * | 11/2015 | Clark | ..................... | G06Q 20/12 705/44 |
| 2017/0163617 A1 * | 6/2017 | Laxminarayanan | .. | H04L 9/3234 |
| 2017/0200165 A1 * | 7/2017 | Laxminarayanan | ........................ | G06Q 20/4018 |
| 2020/0273032 A1 * | 8/2020 | Narayan | ............... | G06Q 20/322 |
| 2021/0337033 A1 * | 10/2021 | Madisetti | ............... | H04L 67/104 |
| 2021/0352139 A1 * | 11/2021 | Madisetti | .................. | H04L 9/50 |
| 2022/0021538 A1 * | 1/2022 | Madisetti | .............. | H04L 63/105 |
| 2022/0166626 A1 * | 5/2022 | Madisetti | ................ | H04L 41/40 |
| 2022/0191272 A1 * | 6/2022 | Madisetti | .............. | H04L 67/104 |
| 2023/0261878 A1 * | 8/2023 | Madisetti | ............. | H04L 9/3236 709/227 |

* cited by examiner

*Primary Examiner* — J. Brant Murphy
(74) *Attorney, Agent, or Firm* — Keller Preece PLLC

(57) ABSTRACT

The present disclosure relates to systems, non-transitory computer-readable media, and methods for processing access requests on a service-to-service basis using a third-party identification token. In particular, the disclosed systems can identify that a user is authenticated for a first computer service based on detecting a third-party identification token. Further, the disclosed systems can generate, by the first computer service, an access request comprising a requested action and the third-party identification token to a second computer service. Additionally, the disclosed systems can determine, by the second computer service, whether the access request is authorized based on determining that an authorization policy defined at the second computer service authorizes the requested action by the first computer service and that the third-party identification token is valid. Moreover, the disclosed systems can provide, to the first computer service, a response to the access request in response to determining whether the access request is authorized.

20 Claims, 12 Drawing Sheets

```
Code   Blame  10 lines  (10 loc)  •  3.5 KB  •  ⓣ                                                          [✎] [▶] [<>]
                                                                                                           [↲] [Raw]
1  "access_requests": [
2    {"path": "/ping",                                                        "allowed_actions": ["GET"],  "allowed_services": []},
3    {"path": "/twirp/company.checkdeposit.v2./CheckDepositAPI/AcceptCheckDeposit",        "allowed_actions": ["POST"], "allowed_services": ["Service A","Service B"]},
4    {"path": "/twirp/company.checkdeposit.v2./CheckDepositAPI/GetCheckDepositEligibility","allowed_actions": ["POST"], "allowed_services": ["Service B","Service C"]},
5    {"path": "/twirp/company.checkdeposit.v2./CheckDepositAPI/GetCheckDepositsByStatus",  "allowed_actions": ["POST"], "allowed_services": ["Service A","Service C"]},
7  ]
10 }
```

500 ⟶

504 — Code

506 — lines 3–6

508 — path entries

510 — allowed_actions / allowed_services

*Fig. 5*

PROCESSING ACCESS REQUESTS ON A SERVICE-TO-SERVICE BASIS USING A THIRD-PARTY IDENTIFICATION TOKEN

BACKGROUND

Modern organizations that have adopted conventional microservices architecture often face significant challenges with service-to-service authentication. In a microservices setup, different services need to securely communicate with each other, requiring robust authentication mechanisms. However, the decentralized and dynamic nature of microservices can complicate the implementation of secure authentication. For example, each service might use different technologies and platforms, making unified authentication protocols difficult to establish and maintain. Furthermore, the sheer number of service interactions increases the complexity, as each service must authenticate its identity before interacting with others. This often leads to vulnerabilities, as traditional monolithic authentication systems may not scale well or adapt quickly enough to the fast-paced changes and deployment cycles typical in microservices environments. As a result, organizations struggle to ensure consistent and secure authentication, which can lead to broken or compromised service interactions.

Although conventional systems can manage user identities and control access to applications and services, such systems have a number of problems in relation to efficiency, flexibility of operation, and accuracy. For instance, conventional systems inefficiently process authentication and authorization requests. Specifically, conventional systems often include complex configurations including numerous group memberships and/or permission scopes which can cause high latency in authentication and authorization processes. Additionally, conventional systems often utilize extensive access policies that can also cause higher latency. In addition, each of these drawbacks also partially increase latency by utilizing large amounts of computer resources. For example, many conventional systems utilize a complex centralized configuration which often requires large amounts of computer resources by making many calls to various containers and services.

Further, some conventional systems demonstrate operational inflexibility by utilizing a centralized and user-based authentication configuration, in addition to their inefficiencies. For example, the centralized, user-based authentication configuration reduces flexibility because many conventional systems assign every user of every service to various group memberships and/or permission scopes in a single extensive access policy. Thus, in this centralized configuration, access and authorization processes for each service cannot easily be tailored to the specific needs and constraints of the services.

In addition to their inefficiencies and inflexibility, some conventional systems inaccurately authenticate and authorize users by consolidating these processes into a centralized configuration. For example, conventional systems propagate any errors, misconfigurations, and/or outdated information in the centralized access policy to all of the services of the global system. This can result in granting unauthorized access or denying access to legitimate users. Thus, the permission accuracy of convention systems suffer because of these described limitations.

These along with additional problems and issues exist with regard to conventional identity and access control systems.

SUMMARY

Embodiments of the present disclosure provide benefits and/or solve one or more of the foregoing or other problems in the art with systems, non-transitory computer-readable media, and methods for processing access requests on a service-to-service basis using a third-party identification token. In one or more embodiments, the third-party identification token can include various types, such as a cloud Identity and Access Management (IAM) token, or a Security Token Service (STS) token, among others. In particular, the disclosed systems can authenticate a user of a computer service within a computer system environment by detecting a third-party identification token generated by a third-party authentication service. More specifically, the disclosed systems can determine the authenticity of an access request from a first computer service to a second computer service using the third-party identification token. For example, the disclosed systems can authenticate the access request using the third-party identification token, then compare the access request to an authorization policy of the second computer service. Further, the disclosed systems can provide a response to the access request and generate a decision report for the access request to provide information about the response (e.g., whether it was allowed or denied) and reasons for a denial response. Additionally, the disclosed systems can operate in a test mode or an enforce mode and incorporate observability via tools such as a Datadog or have alerts be written to a slack channel.

Additional features and advantages of one or more embodiments of the present disclosure are outlined in the description which follows, and in part can be determined from the description, or may be learned by the practice of such example embodiments.

BRIEF DESCRIPTION OF THE DRAWINGS

The detailed description provides one or more embodiments with additional specificity and detail through the use of the accompanying drawings, as briefly described below.

FIG. 5 illustrates an authorization policy of a computer service in accordance with one or more embodiments.

DETAILED DESCRIPTION

Figure 1:
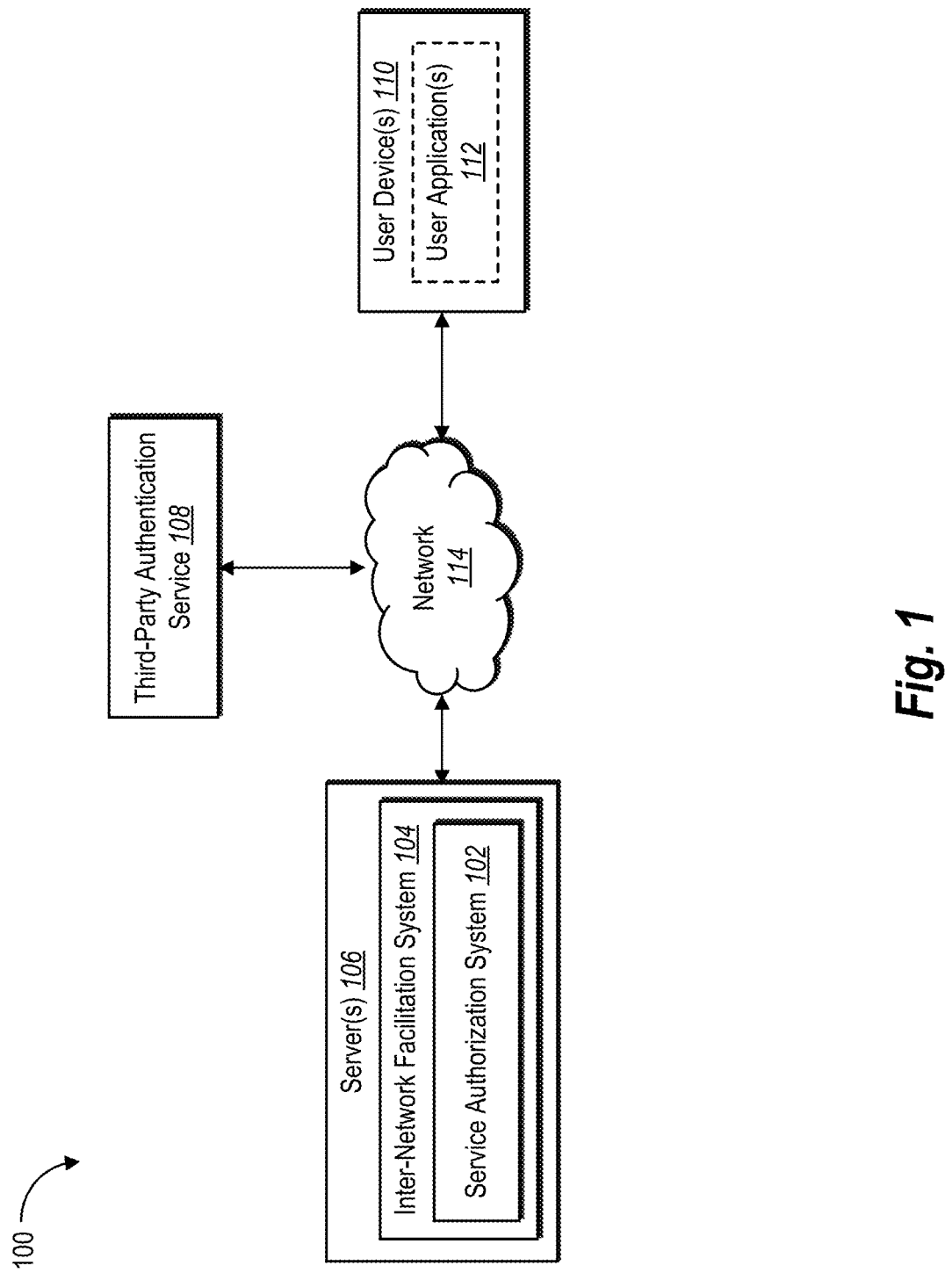
FIG. 1 illustrates a diagram of an environment in which a service authorization system can operate in accordance with one or more embodiments.

This disclosure describes one or more embodiments of a service authorization system that processes access requests on a service-to-service basis using a third-party identification token and computer service-specific authorization policies. Specifically, the service authorization system can authenticate a user of a computer service within a computer system environment by detecting a third-party identification token generated by a third-party authentication service. More specifically, the service authorization system can determine the authenticity of an access request from a first computer service to a second computer service using the third-party identification token. For example, the service authorization system can authenticate the access request using the third-party identification token, then compare the access request to an authorization policy of the second computer service. Further, the service authorization system can provide a response to the access request and generate a decision report for the access request to provide information about the response (e.g., whether it was allowed or denied) and reasons for a denial response. Additionally, the service authorization system can operate in a test mode or an enforce mode and incorporate collaboration and communication tools such as a slack channel.

As mentioned above, in some embodiments, the service authorization system authenticates a user of a computer service by detecting a third-party identification token generated by a third-party authentication service. Once authenticated, the service authorization system retains the third-party identification token to send as part of the access requests that the service authorization system generates through the first computer service. Indeed, in these or other embodiments, the service authorization system determines the authenticity of an access request from the first computer service to a second computer service using the third-party identification token associated with the first computer service.

As noted above, in some implementations, the service authorization system authenticates the access request using the third-party identification token and compares the access request to an authorization policy defined by the second computer service. In particular, the service authorization system compares various components of the access request to allowed access requests of the authorization policy of the second computer service. In these or other embodiments, the service authorization system compares components of the access request such allowed actions and corresponding allowed computer services (also referred to herein simply as "allowed services") to the requested action and the first computer service.

As mentioned previously, in one or more embodiments, the service authorization system provides a response to the access request and generates a decision report for the access request to provide information about the response (e.g., whether it was allowed or denied) and reasons for a denial response. Specifically, in the case of an allowed access request, the service authorization system can perform the requested action on the second computer service, then generate and send the response to the first computer service. Alternatively, in the case of a denied access request, the service authorization system can provide a denial response to the first computer service. Further, in one or more implementations, the service authorization system can generate a decision report including information regarding responses to access requests received by the second computer service. Furthermore, in some embodiments, the service authorization system includes reasons for denial responses such as determining that the access requests have one or more of various errors including, by way of example, and not limitation, a route not found, a valid token but invalid caller, a missing token, or an invalid token.

As noted previously, in some implementations, the service authorization system operates in a test mode or an enforce mode and incorporates collaboration and communication tools (also referred to herein simply as "communication tools"). In particular, the service authorization system can operate in a test mode to configure and verify the accuracy of the authorization policy. Further, in one or more embodiments, the service authorization system can operate in an enforce mode for live processing of access requests from other computer services. Moreover, in one or more implementations, the service authorization system can include collaboration and communication tools such as Datadog dashboards or a slack channel for distributing information about responses to access requests. For example, in some embodiments, the service authorization system provides information regarding denial responses and reasons for the denial responses to the communication tools such as a slack channel.

As suggested by the foregoing, the service authorization system provides a variety of technical advantages relative to conventional systems. For example, by utilizing a third-party authentication service and localized authorization policies, the service authorization system improves efficiency relative to conventional systems. Specifically, the service authorization system reduces latency by maintaining authorization policies localized at each computer service and maintaining the policy definitions locally within the service code repository of each computer service. Thus, the service authorization system can make all of the authorization policy decisions for a computer service within a single component of the computer service (e.g., a container for a sidecar) rather than making many calls to various containers and computer services. Moreover, by authenticating users on a computer service basis with the third-party identification token generated by the third-party authentication service, the service authorization system also reduces latency relative to conventional systems because the service authorization system does not need to use complex group memberships and/or permission scopes on a user-by-user basis. Additionally, by authenticating users on a computer service basis with the third-party identification token, the service authorization system increases resiliency because there is no centralized authorization service that disables authorization for each service when down. Moreover, the service authorization system reduces latency and improves efficiency by utilizing computer service-specific authorization policies thereby minimizing computer resource utilization. Indeed, the service authorization system achieves an SLA and SLO availability of 99.999% and processes authentication requests in most cases in less than one millisecond per authorization request.

Furthermore, by utilizing distributed, computer service-specific authorization policies the service authorization system improves flexibility relative to conventional systems. Specifically, the service authorization system can tailor the authorization policies to the specific needs and constraints of the individual computer services. For example, the service authorization system can define allowed actions and corresponding allowed services for various access requests specific to the computer service. Moreover, by assigning allowed services for each allowed action, the service authorization system can implement computer service-to-computer service (also referred to herein simply as "service-to-service") authentication and authorization rather than requiring each computer service to define group memberships and/or permission scopes on a user-by-user basis. Thus, the service authorization system provides a distributed and flexible mechanism for computer service-specific authentication and authorization processes.

Moreover, by utilizing a distributed configuration for authentication and access, the service authorization system improves accuracy relative to conventional systems. Specifically, the service authorization system localizes any errors, misconfigurations, and/or outdated information in computer service-specific authorization policy to the specific computer service rather than exporting it throughout the global system. Moreover, by implementing the service-to-service authorization policies, the service authorization system need only verify the third-party identification token to accurately authorize access requests from authentic users of the originating computer service. Thus, the service authorization system improves accuracy by minimizing the errors associated with global user-by-user authentication.

Turning now to the figures, FIG. 1 illustrates a block diagram of a system 100 (or system environment) for implementing an inter-network facilitation system 104 and a service authorization system 102 in accordance with one or more embodiments. As shown in FIG. 1, system 100 includes server(s) 106 (which includes inter-network facilitation system 104 and service authorization system 102), user device(s) 110, and third-party authentication service 108. As further illustrated in FIG. 1, the server(s) 106, the user device(s) 110, and the third-party authentication service 108 can communicate via the network 114.

Although FIG. 1 illustrates the service authorization system 102 being implemented by a particular component and/or device within system 100, the service authorization system 102 can be implemented, in whole or in part, by other computing devices and/or components within the system 100 (e.g., the user device(s) 110). Additional description regarding the illustrated computing devices (e.g., the server(s) 106, computing devices implementing the service authorization system 102, the user device(s) 110, and/or the network 114) is provided with respect to FIGS. 10 & 11 below.

As shown in FIG. 1, the server(s) 106 can include the inter-network facilitation system 104. In some embodiments, the inter-network facilitation system 104 can determine, store, generate, and/or display financial information corresponding to a user account (e.g., in a banking application or a money transfer application). Furthermore, the inter-network facilitation system 104 can also electronically communicate (or facilitate) financial transactions between one or more user accounts (and/or computing devices). Moreover, the inter-network facilitation system 104 can also track and/or monitor financial transactions and/or financial transaction behaviors of a user within a user account.

The inter-network facilitation system 104 can include a system that comprises the service authorization system 102 and that facilitates financial transactions and digital communications across different computing systems over one or more networks. For example, the inter-network facilitation system 104 manages credit accounts, secured accounts, and other accounts for one or more accounts registered within the inter-network facilitation system 104. In some cases, the inter-network facilitation system 104 is a centralized network system that facilitates access to online banking accounts, credit accounts, and other accounts within a central network location. Indeed, the inter-network facilitation system 104 can link accounts from different network-based financial institutions to provide information regarding, and management tools for, the different accounts.

As illustrated in FIG. 1, system 100 includes third-party authentication service 108. In one or more embodiments, the third-party authentication service 108 receives or accesses network transaction information and/or additional data associated with a network transaction (e.g., user data, historical transaction data, location data, etc.) from the inter-network facilitation system 104 and/or the service authorization system 102 to generate a third-party identification token for one or more computer services of a computer system environment. In some cases, the third-party authentication service 108 receives information and/or data associated with a user access request to a computer service from the service authorization system 102 and/or the inter-network facilitation system 104 in order to authenticate access to the computer system and generate a third-party identification token for such access. As illustrated, third-party authentication service 108 can be located on a separate server. In some cases, the third-party risk analysis server can be integrated or included in the service authorization system 102 or the inter-network facilitation system 104.

As also illustrated in FIG. 1, system 100 includes the user device(s) 110. For example, the user device(s) 110 may include, but are not limited to, mobile devices (e.g., smartphones, tablets) or other types of computing devices, including those explained below with reference to FIGS. 10 & 11. Additionally, the user device(s) 110 can include computing devices associated with (and/or operated by) user accounts for the inter-network facilitation system 104. Moreover, system 100 can include various numbers of user devices that communicate and/or interact with the inter-network facilitation system 104 and/or the service authorization system 102.

Furthermore, as shown in FIG. 1, the user device(s) 110 can include user application(s) 112. User application(s) 112 can include instructions that (upon execution) cause the user device(s) 110 to perform various actions. For example, a user of a user account can interact with user application(s) 112 on user device(s) 110 to access financial information, initiate a financial transaction (e.g., transfer money to another account, deposit money, withdraw money), and/or access or provide data (to the server(s) 106). Furthermore, in one or more implementations, the user application(s) 112 can display one or more graphical user interfaces from which the service authorization system 102 can receive and display information regarding network transactions.

In certain instances, the user device(s) 110 corresponds to one or more user accounts (e.g., user accounts stored at the server(s) 106). For instance, a user of a user device can establish a user account with various information corresponding to the user and for accessing various computer systems within a computer system environment. In addition, the user accounts can include a variety of information regarding access to computer systems. In some embodiments, a user account can be accessed via multiple devices (e.g., multiple user devices) when authorized and authenticated to access the user account within the multiple devices.

The present disclosure utilizes user devices to refer to devices associated with such user accounts. In referring to a user device, the disclosure and the claims are not limited to communications with a specific device but any device corresponding to a user account of a particular user. Accordingly, in using the term user device, this disclosure can refer to any computing device corresponding to a user account of the inter-network facilitation system 104.

As further shown in FIG. 1, the system 100 includes the network 114. As mentioned above, the network 114 can enable communication between components of the system 100. In one or more embodiments, the network 114 may include a suitable network and may communicate using a various number of communication platforms and technologies suitable for transmitting data and/or communication signals, examples of which are described with reference to FIG. 11. Furthermore, although FIG. 1 illustrates the server(s) 106, the user device(s) 110, and the third-party authentication service 108 communicating via the network 114, the various components of the system 100 can communicate and/or interact via other methods (e.g., the server(s) 106 and the user device(s) 110 can communicate directly).

As previously mentioned, in some implementations, the service authorization system processes access requests on a service-to-service basis using a third-party identification token and computer service-specific authorization policies. For example, FIG. 2 illustrates a process flow of utilizing a third-party identification token to process an access request from a first computer service to a second computer service in accordance with one or more embodiments.

Figure 2:
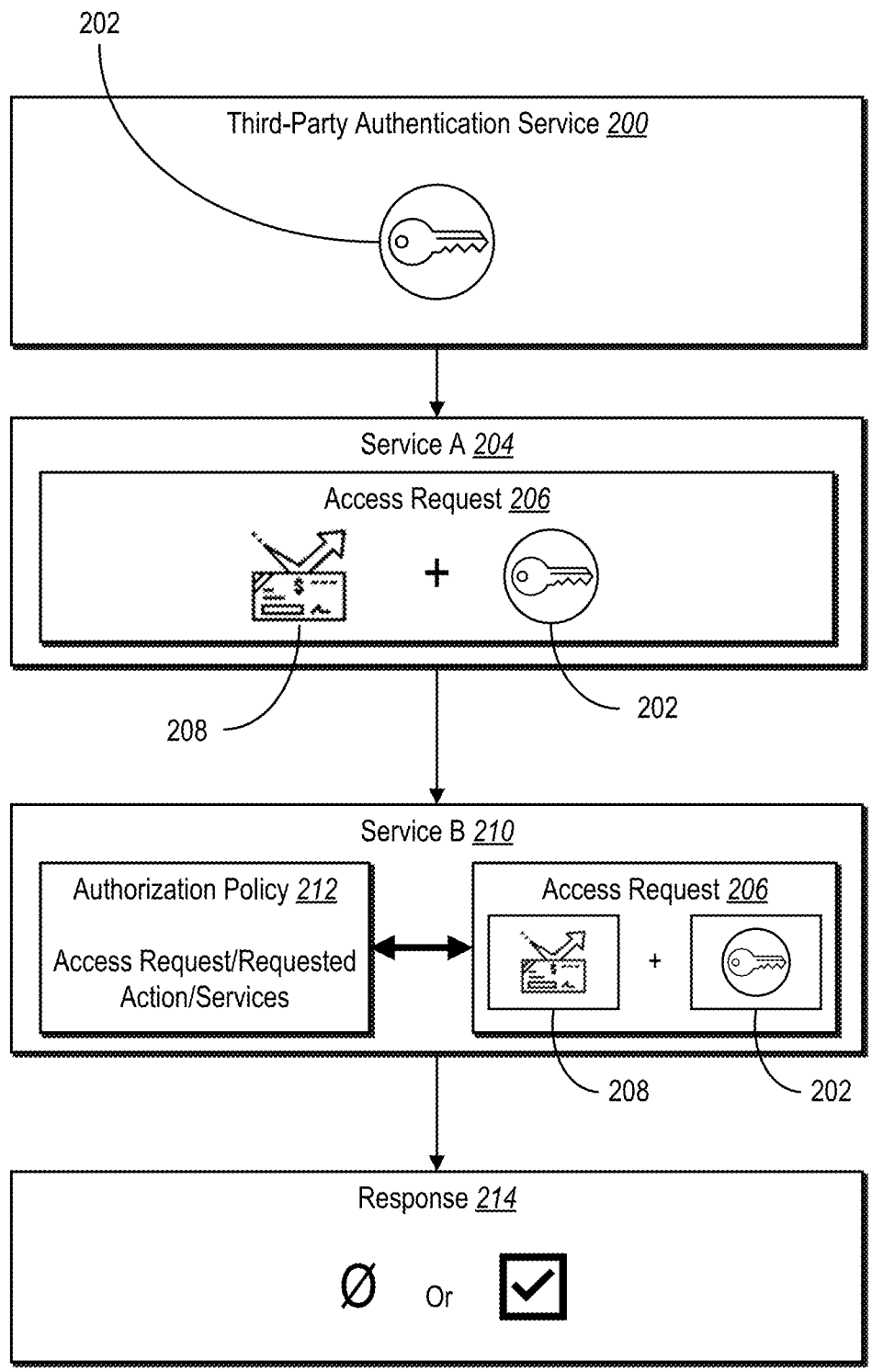
FIG. 2 illustrates a process flow of utilizing a third-party identification token to process an access request from a first computer service to a second computer service in accordance with one or more embodiments.
Figure 3:
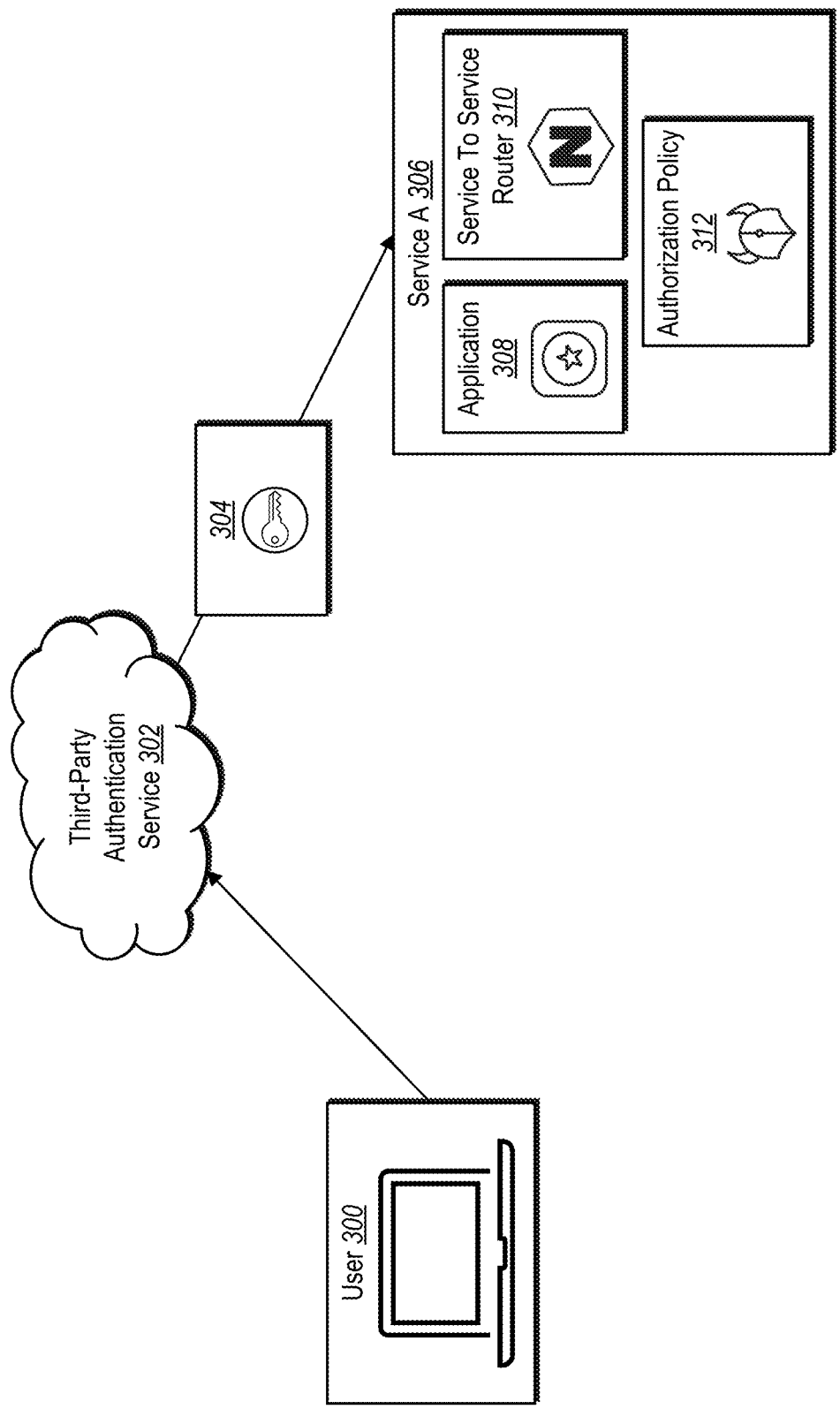
FIG. 3 illustrates a process flow of generating a third-party identification token to identify that a user is authenticated for a computer service in accordance with one or more embodiments.

As illustrated in FIG. 2, in one or more embodiments, the service authorization system 102 utilizes a third-party authentication service 200 to generate a third-party identification token 202 as discussed in further detail with respect to FIG. 3. Specifically, in response to user interaction via a user device, the service authorization system 102 accesses the third-party authentication service 200 and generates the third-party identification token 202. Furthermore, in one or more implementations, the service authorization system 102 utilizes the third-party identification token 202 with a computer service, such as Service A 204, within a computer system environment.

Figure 4:
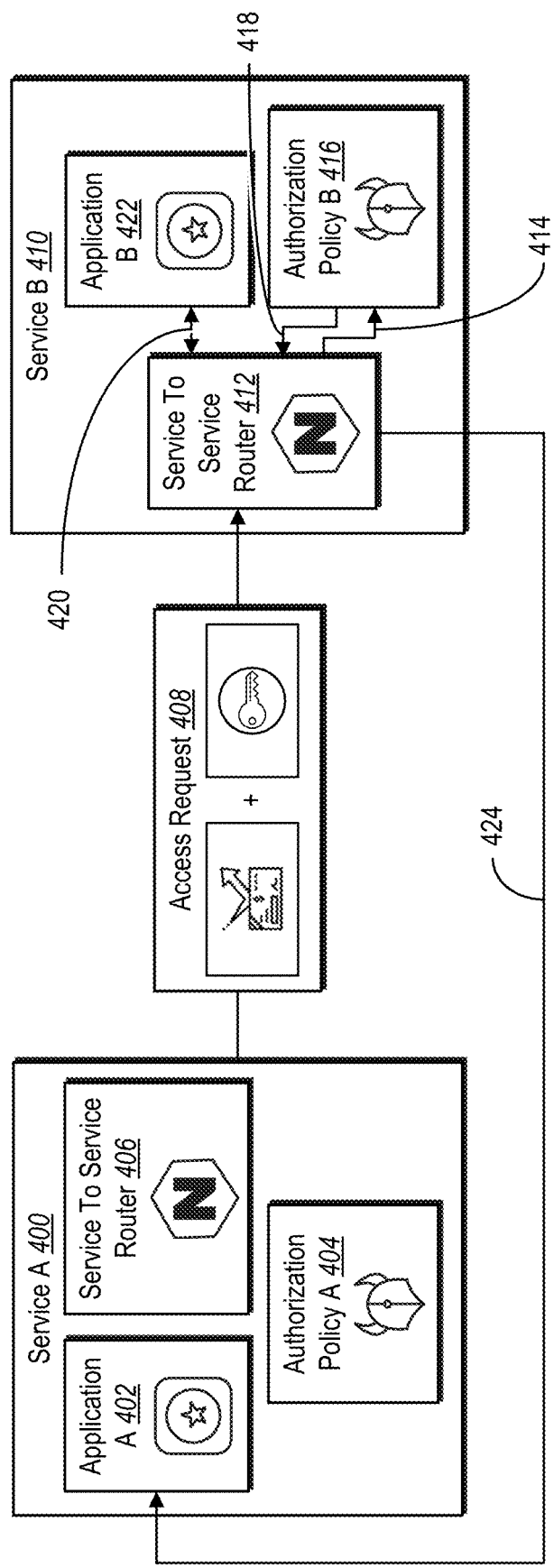
FIG. 4 illustrates a process flow of generating an access request from a first computer service and providing a response from a second computer service in accordance with one or more embodiments.

As further illustrated in FIG. 2, in some embodiments, the service authorization system 102 generates an access request 206 using Service A 204 as discussed in further detail with respect to FIG. 4. In particular, the service authorization system 102 generates the access request 206 to include a requested action 208 and the third-party identification token 202. Additionally, in some implementations, the service authorization system 102 provides the access request 206 to another service within the computer system environment, such as Service B 210.

As additionally shown in FIG. 2, in one or more embodiments, the service authorization system 102 utilizes Service B 210 to determine whether the access request is authorized as discussed in further detail with respect to FIGS. 4 and 5. Specifically, the service authorization system 102 verifies whether the third-party identification token 202 is valid and compares the access request 206 with an authorization policy 212. Further, in one or more implementations, the service authorization system 102 generates the authorization policy 212 locally within Service B 210 such that the authorization policy is tailored to Service B 210. Moreover, the service authorization system 102 can utilize various components of the authorization policy 212 to determine whether the access request is authorized as discussed in further detail below with respect FIG. 5.

As further illustrated in FIG. 2, in some embodiments, the service authorization system 102 generates and provides a response 214. In particular, the service authorization system 102 generates a denial response or returns a response indicating that the requested action was (or will be) performed. Furthermore, as previously noted, the service authorization system 102 can operate in a test mode or an enforce mode as will be discussed in further detail with respect to FIGS. 6A and 6B. Additionally, in some implementations, the service authorization system 102 can generate a decision report including information regarding the access requests received by Service B 210 utilizing either the test mode or the enforce mode as will be discussed in further detail with respect to FIG. 7. Additionally, as mentioned above, the service authorization system 102 can include communication tools such as a slack channel for displaying information regarding the access request responses of the various computer services within the computer system environment as will be discussed in further detail with respect to FIG. 8.

As noted above, in one or more embodiments, the service authorization system 102 utilizes a third-party authentication service to generate a third-party identification token. Further, in one or more implementations, the service authorization system 102 utilizes the third-party identification token to identify that a user is authenticated for a computer service within a computer environment. For example, FIG. 3 illustrates a process flow of generating a third-party identification token to identify that a user is authenticated for a computer service in accordance with one or more embodiments.

As shown in FIG. 3, in some embodiments, the service authorization system 102 receives a login request from a user 300 for access to a computer service (e.g., service A 306) within a computer system environment. As used herein, the term "computer service" refers to a software component that provides specific functionality through a defined interface. Indeed, in some implementations, a computer service interacts with other components or applications to interact over a network. Moreover, a computer service can encapsulate logic and/or operational tasks and is designed for interoperability with other services within a computer system environment, offering a modular approach that supports a reusable, maintainable, and scalable software architecture. Furthermore, in one or more embodiments, a computer service includes an application 308, a service-to-service router 310, and an authorization policy 312, among other computer service components.

Relatedly, as used herein, the term "computer system environment," in one or more implementations, refers to a all the essential components and settings that allow a computer system to operate and fulfill specific tasks or services. For example, the computer system environment includes the hardware, such as servers, computers, and peripherals, which determine the system's physical capabilities and limits. Additionally, in some embodiments, the computer system environment also incorporates the software environment, which consists of operating systems, computer services, applications, and utilities needed for the system to perform its functions. Additionally, in some implementations, the computer system environment includes the network environment with routers, network connections, and security settings that facilitate and secure data communication between devices.

As also depicted in FIG. 3, in one or more embodiments, the service authorization system 102 identifies that the user 300 is authenticated for service A 306 by utilizing the third-party authentication service 302. As used herein, the term "third-party authentication service" refers to a system that manages and verifies user identities outside of the service authorization system 102, facilitating secure access control. In one or more implementations, the third-party authentication service handles the authentication process on behalf of the service authorization system 102, such as by verifying user credentials and providing tokens or assertions that confirm an identity. For instance, in some embodiments, the service authorization system 102 can utilize the third-party authentication service 302 to generate a third-party identification token (e.g., third-party identification token 304). As used herein, the term "third-party identification token" refers to a digital credential issued by a third-party authentication service to verify a user's identity to a third-party service. In some implementations, the third-party identification token encapsulates user identity information and is used to identify authentication and/or authorization details without exposing user credentials directly.

As mentioned previously, the service authorization system 102 utilizes the third-party authentication service 302 to identify that the user is authenticated for service A 306. For example, the service authorization system 102 utilizes service A 306 to deploy a function (e.g., a serverless function such as a lambda function) to receive the third-party identification token 304. For example, the service authorization system 102 can utilize service A 306 to invoke a serverless function for accessing the third-party authentication service 302 and receiving the third-party identification token 304. Specifically, the service authorization system 102 receives an identity role from the third-party authentication service 302, uses the identity role to fetch scopes that service A 306 has, and builds a payload (e.g., including an identity role, an expiration, and allowed scopes). Further, the service authorization system 102 can encode (e.g., binary-to-text) and sign the payload with a private key (from the third-party authentication service 302) to generate the third-party identification token 304. In one or more embodiments, the service authorization system 102 can utilize a separate service rather than a serverless function to receive the third-party identification token 304. Moreover, in one or more implementations, the service authorization system 102 can utilize the third-party identification token 304 with service A 306 to call, e.g., by sending an access request to, other computer services within the computer system environment as discussed further with respect to FIG. 4.

In some embodiments, by generating a third-party identification token for each computer service (e.g., service A 306), the service authorization system 102 improves efficiency because the service authorization system 102 can utilize the third-party identification tokens for the various computer services within the computer system environment to authorize access requests rather than maintaining centrally configured permission scopes for the various users of the various computer services.

As noted previously, in some implementations, the service authorization system 102 generates an access request using a first computer service and a response with a second computer service. Indeed, in one or more embodiments, the service authorization system 102 generates an access request including a requested action from a first computer service to a second computer service to generate a response from the second computer service. For example, FIG. 4 illustrates a process flow of generating an access request from a first computer service and providing a response from a second computer service in accordance with one or more embodiments.

As portrayed in FIG. 4, in one or more implementations, the service authorization system 102 can generate an access request 408 by a first service, such as service A 400, to a second computer service, such as service B 410 within a computer system environment. In these or other embodiments, each of the services can include various components such as an application, an authorization policy, and a service-to-service router. For example, as shown in FIG. 4, service A 400 includes application A 402, authorization policy A 404, and service-to-service router 406.

As previously mentioned, in some embodiments, the service authorization system 102 generates an access request 408. As used herein, the term "access request" refers to a request to access another service within a computer system environment. Specifically, an access request can include a request from one computer service to access a particular functionality of a second computer service to generate an action and a response from the second service. In some implementations, an access request can include a requested action and/or a third-party identification token. For example, a third-party identification token can be included as part of a header of the access request. Relatedly, the term "action," as used herein, refers to an action performable by a computer service. Specifically, an action can include actions of data processing and management, user interaction management, integration and communication, resource management, automated workflows and tasks, etc. Furthermore, actions can include requested actions or allowed actions. As used herein, the term "requested action" refers to actions requested by a computer service (e.g., to be included with an access request). Additionally, the term "allowed action," as used herein, refers to an action that is authorized for a path within an authorization policy.

As further illustrated in FIG. 4, in one or more embodiments, the service authorization system 102 determines whether the access request 408 is authorized by service B 410. For instance, as previously noted, by service A 400, the service authorization system 102 can generate the access request 408 to service B 410. In particular, service B 410 can receive the access request 408 at the service-to-service router 412 of service B 410. Further, in one or more implementations, the service authorization system 102 uses the service-to-service router 412 to forward the access request 408 (e.g., via path 414) to authorization policy B 416 to determine whether the access request 408 is authorized. In these or other embodiments, the service authorization system 102 forwards the access request 408 by path 414 to authorization policy B 416 rather than determining permission scopes of service A 400 (or a user thereof) and then passing the access request 408 directly to application B 422 by path 420. Indeed, in these or other embodiments, the service authorization system 102 determines authorization of the access request 408 without determining a permission scope for a user of service A 400. Moreover, in these or other embodiments, by utilizing the authorization policy B 416 local to service B 410, the service authorization system 102 improves efficiency by eliminating the need for centrally determining group memberships and/or permission scopes on a user-by-user basis for users of service A 400.

As used herein, the term "permission scope" refers to the extent or range of access rights and privileges that a computer system grants to a user, application, or service within a centralized authentication and authorization framework. Specifically, a permission scope is defined based on roles or specific policies, which are centrally managed to ensure that the entity has the appropriate level of access necessary for its function without exceeding it. For instance, in such centrally managed systems, a permission scope can include rights to access specific actions of a computer service, etc.

As mentioned above, the service authorization system 102 determines whether the access request 408 is authorized by service B 410. Specifically, in some embodiments, the service authorization system 102 determines whether the access request 408 is authorized based on determining whether third-party identification token of the access request 408 is valid. For example, in some implementations, the service authorization system 102 utilizes authorization policy B 416 to validate (e.g., by a signature) the third-party identification token against a public key of the third-party authentication service. In these or other embodiments, the public key corresponds to a private key that the service authorization system 102 uses to sign the third-party identification token (e.g., by a stateless function at the third-party authentication service). Furthermore, in one or more embodiments, the service authorization system 102 can hardcode the public key in the individual authorization policies (e.g., authorization policy B 416) of the various computer services within the computer system environment.

Additionally, in one or more implementations, the service authorization system 102 further determines whether the access request 408 is authorized based on determining whether authorization policy B 416, defined at service B 410, authorizes the requested action of the access request 408. Determining whether authorization policy B 416 authorizes the requested action will be discussed in further detail with respect to FIG. 5.

As additionally shown in FIG. 4, in some embodiments, the service authorization system 102 provides a response to the access request 408 by service B 410 to service A 400 by path 424. In particular, the service authorization system 102 provides the response to service A 400 in response to determining whether the access request 408 is authorized. For example, in response to determining that the access request 408 is authorized, the service authorization system 102 performs the requested action on service B 410, generates the response to the access request 408, and provides the response to service A 400.

To illustrate, in response to determining that the access request 408 is authorized, the service authorization system 102 provides notification of success (e.g., HTTP 200) to the service-to-service router 412 via path 418. Additionally, the service authorization system 102 utilizes the service-to-service router 412 to forward the requested action to application B 422 (e.g., by path 420) to perform the requested action. Further, in some implementations, the service authorization system 102 utilizes application B 422 to notify the service-to-service router 412 of completion (or initiation, scheduling, etc.) of the requested action (e.g., by path 420). Moreover, the service authorization system 102 generates the response and utilizes the service-to-service router 412 to return the response to service A 400 via path 424. In one or more embodiments, when forwarding the requested action to application B 422 from the service-to-service router 412 via path 420, the service authorization system 102 removes the third-party identification token header of the access request 408 and replaces it with headers including, for instance, the identities, roles, and scopes of service A 400 (and/or users of service A).

In one or more implementations, in response to determining that the access request 408 is not authorized, the service authorization system 102 can provide a denial response (e.g., an HTTP 403) to service A 400. To illustrate, in response to determining that the access request 408 is not authorized, the service authorization system 102 generates the denial response, provides the denial response to the service-to-service router 412 (e.g., by path 418), and uses the service-to-service router 412 to return the response to service A 400 (e.g., via path 424). Specifically, in some embodiments, the service authorization system 102 returns the response to application A 402 of service A 400.

Furthermore, in some implementations, the service authorization system 102 can emit metrics from the authorization policy for generating a decision report. For example, the service authorization system 102 can emit metrics including allowed and/or denied access requests and their associated information (e.g., calling and receiving computer service names, etc.). For example, the service authorization system 102 can utilize the authorization policy B 416 to emit metrics which include reasons (such as by specifying specific errors) for denying access requests. The decision report and associated information will be discussed in further detail with respect to FIG. 7.

In one or more embodiments, by utilizing a localized (i.e., local to the computer service) authorization policies, such as authorization policy B 416, the service authorization system 102 improves efficiency relative to conventional systems. For example, by maintaining authorization policies localized at each computer service, the service authorization system 102 can make all of the authorization policy decisions for the computer service within a single component (the authorization policy). Thus, by minimizing the number of components involved in the decisions, the service authorization system 102 can improve a high efficiency and availability (e.g., an SLA and SLO availability of 99.999% and process speeds less than one millisecond per authorization request).

As noted above, in one or more implementations, the service authorization system 102 determines whether an access request is authorized by an authorization policy of a computer service. Indeed, in some embodiments, the service authorization system 102 includes various components such as allowed actions and allowed services to determine whether an access request is authorized. FIG. 5 illustrates an example authorization policy interface in accordance with one or more embodiments.

As depicted in FIG. 5, in some implementations, the service authorization system 102 generates and/or defines an authorization policy 504 of a computer service for display on an authorization policy interface 502 of a user device 500. As used herein, the term "authorization policy" refers to computer code intended to authorize or deny an access request to a computer service. Specifically, an authorization policy can include components such as paths, allowed actions, allowed services, etc., for comparison with corresponding components of an access request.

In one or more embodiments, the service authorization system 102 generates and/or defines an authorization policy unique to each computer service in a computer system environment. For example, the service authorization system 102 defines the authorization policy 504 at a single computer service. Additionally, the service authorization system 102 can define the authorization policies of different computer services using different programming languages. In other words, in one or more implementations, the service authorization system 102 generates the authorization policies to execute authorization of access requests across computer services within the computer system environment in a programming language agnostic manner.

In some embodiments, by utilizing this distributed, computer service-specific authorization policy format, the service authorization system 102 improved flexibility relative to conventional systems. For example, the service authorization system 102 can define authorization parameters (e.g., paths, allowed actions, allowed services, etc. as described in more detail below) rather than doing so centrally for all computer services within the computer system environment. Further, this approach improves flexibility by being programming language agnostic as mentioned above.

As further illustrated in FIG. 5 and as mentioned previously, the service authorization system 102 can generate the authorization policy 504 to include a path 506. In some implementations, the service authorization system 102 utilizes paths in a first computer service (e.g., in code of an application of a first computer service) to generate a requested action of an access request and provides the access request to the second computer service. Further, in one or more embodiments, the service authorization system 102 utilizes the path 506 to determine whether an access request is authorized. For example, the service authorization system 102 can compare the path of an access request to the defined paths 506 of the authorization policy 504. If the service authorization system 102 determines that the paths do not match, the service authorization system 102 can generate and provide a denial response to the requesting computer service.

Moreover, in one or more implementations, in response to matching the path of an access request to one of the paths 506 defined in the authorization policy 504, the service authorization system 102 determines whether the access request is authorized using the other components of the authorization policy 504. For instance, in some embodiments, the service authorization system 102 utilizes the allowed actions 508 and allowed services 510 associated with each path 506 to determine whether an access request is authorized.

As just mentioned, in some implementations, the service authorization system 102 utilizes the allowed actions 508 of the authorization policy 504 to determine whether an access request is authorized. For example, as also depicted in FIG. 5, the service authorization system 102 defines each path 506 of the authorization policy 504 to include one or more allowed actions 508. As noted previously, the term "allowed action," as used herein, refers to an action that is authorized for a path within an authorization policy.

To illustrate, the service authorization system 102 defines a path 506 (shown in code line 4 of the authorization policy 504) for accepting a check deposit. Furthermore, in this example, the service authorization system 102 defines the allowed action 508 for this path as "Post." In one or more embodiments, the service authorization system 102 compares the requested action of the access request with the allowed action 508 (i.e., "Post"). If the service authorization system 102 determines that the requested action matches the allowed action, the service authorization system 102 can also verify the requesting computer service against the allowed services as described below. On the other hand, if the requested action does not match the allowed action 508, the service authorization system 102 can generate and provide a denial response to the computer service that generated the access request.

As previously mentioned, in one or more implementations, the service authorization system 102 utilizes the allowed services 510 of the authorization policy 504 to determine whether an access request is authorized. For example, as further illustrated in FIG. 5, in some embodiments, the service authorization system 102 defines each path 506 of the authorization policy 504 to include one or more allowed services 510 corresponding to an allowed action 508 and path 506. As used herein, the term "allowed service" refers to a computer service that is authorized to perform an allowed action of a path within an authorization policy.

To illustrate, the service authorization system 102 defines Services A and B as allowed services for the path 506 for accepting a check deposit (in code line 4) and the corresponding allowed action 508 of "Post." Accordingly, in this example, to determine whether the authorization policy 504 authorizes the requested action, the service authorization system 102 determines the allowed services (i.e., Service A and Service B) and compares them with the requesting computer service of the access request. In some implementations, in response to determining whether the access request is authorized by the authorization policy 504, the service authorization system 102 proceeds with performing the requested action and/or providing a response to the access request as described above with respect to FIG. 4.

In one or more embodiments, the service authorization system 102 improves efficiency, operational flexibility, and accuracy over conventional systems by tailoring authorization policies to the specific computer service as described in the foregoing paragraphs. For example, the service authorization system 102 improves efficiency by performing all of the decisions for a computer service within a single component, i.e., the authorization policy as mentioned above. Additionally, the service authorization system 102 improves operational flexibility as the service authorization system 102 can define authorized paths, allowed actions, and allowed services specific to a single computer service. Further, the service authorization system 102 improves accuracy because any errors, misconfigurations, and/or outdated information for authentication and authorization is contained within individual computer services rather than being centrally maintained and affecting all the computer services at once.

Figure 6A:
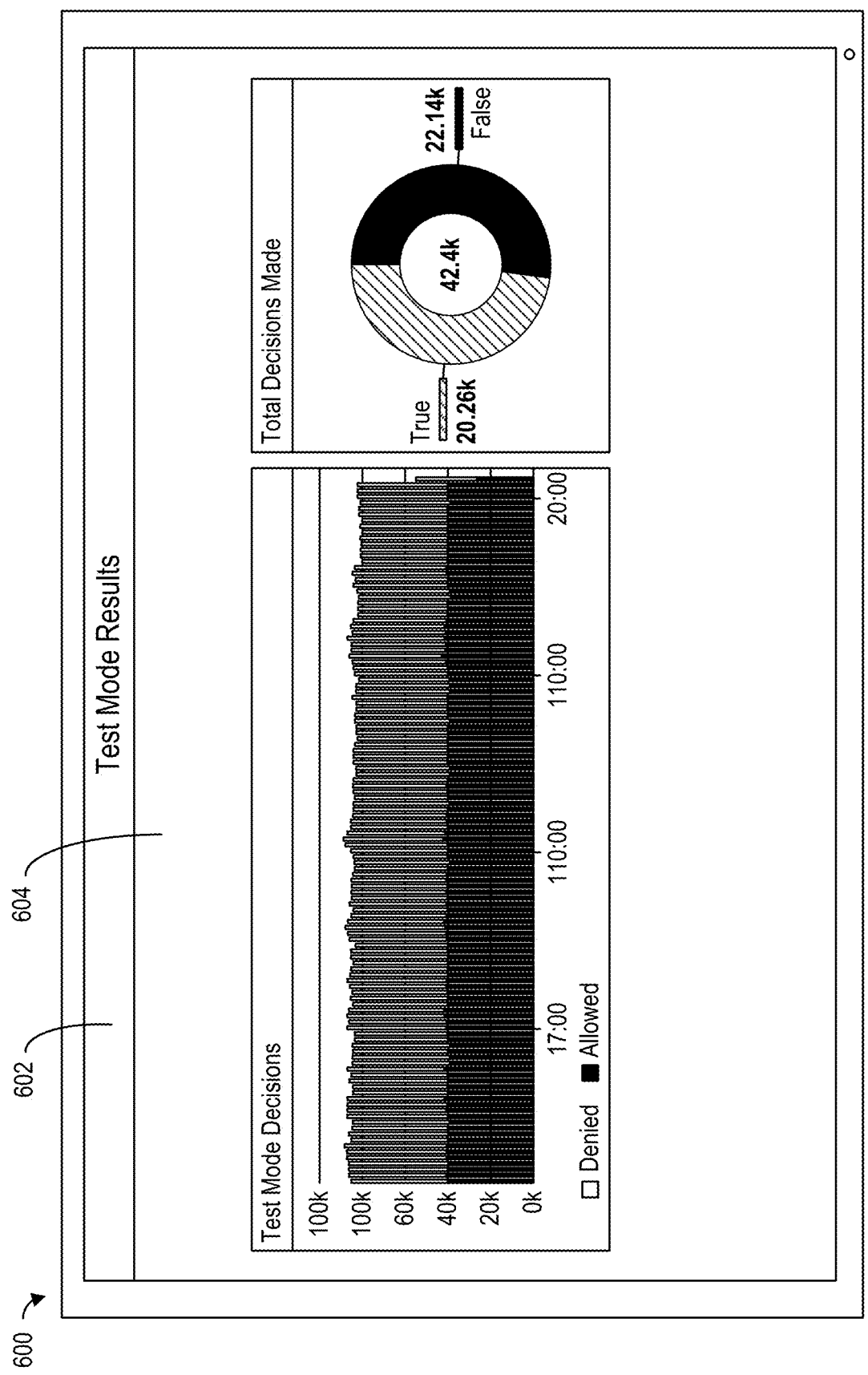
FIG. 6A illustrates an example test mode results interface for a test mode of the service authorization system in accordance with one or more embodiments.
Figure 6B:
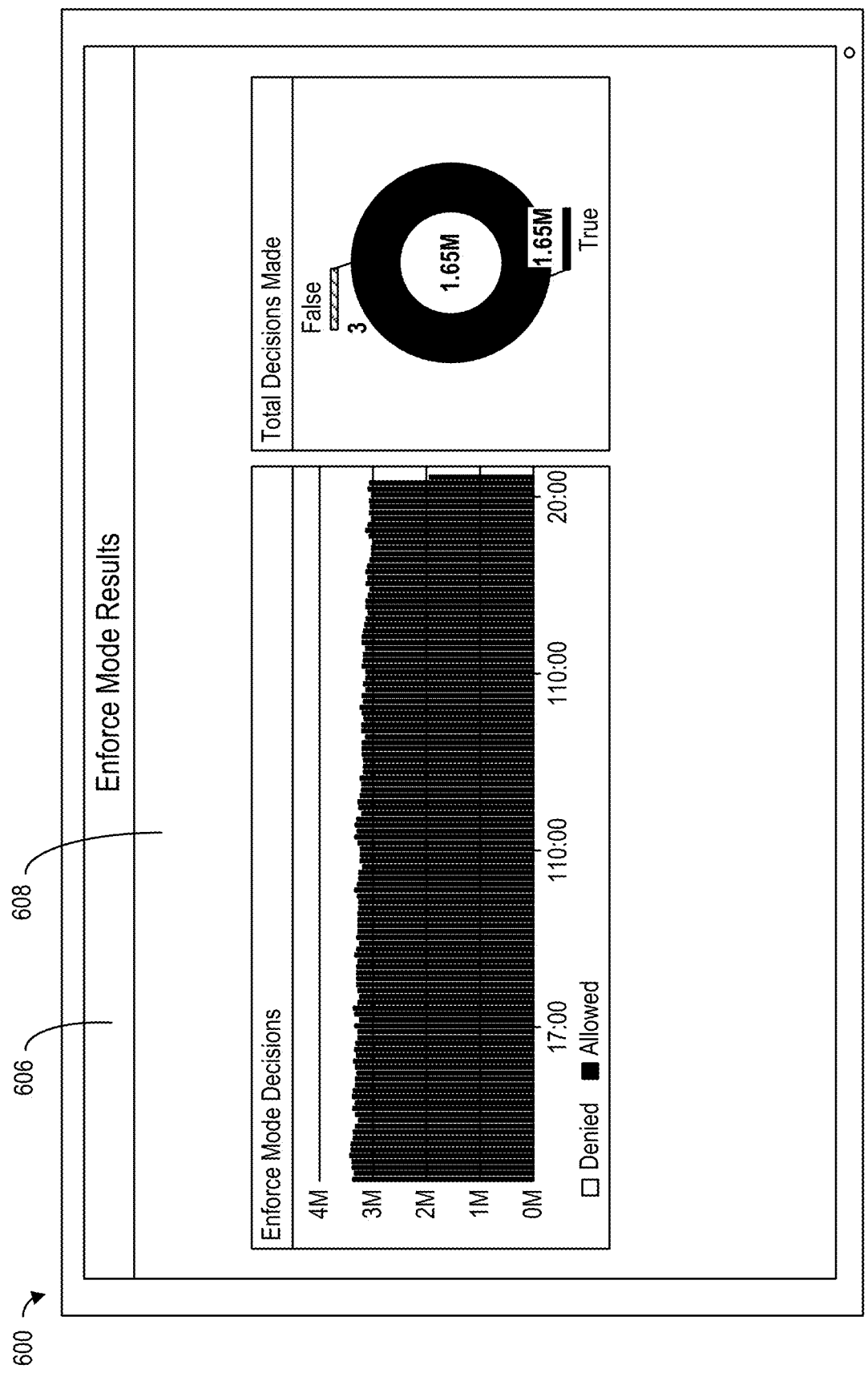
FIG. 6B illustrates an example enforce mode results interface for an enforce mode of the service authorization system in accordance with one or more embodiments.

As previously noted, in one or more implementations, the service authorization system 102 can operate in a test mode or an enforce mode. Indeed, in some embodiments, the service authorization system 102 can operate in an enforce mode to authenticate computer services and authorize access requests as discussed with respect to FIGS. 1-5, or in a test mode to do so prospectively. FIG. 6A illustrates an example test mode results interface for a test mode of the service authorization system 102 in accordance with one or more embodiments. FIG. 6B illustrates an example enforce mode results interface for an enforce mode of the service authorization system 102 in accordance with one or more embodiments.

As mentioned above, the service authorization system 102 can operate in either a test mode or an enforce mode. As used herein, the term "test mode" refers to configuration of the service authorization system 102 wherein the various computer services can be configured. For example, in test mode the service authorization system 102 can make prospective rather than live authentication of computer service and authorization of access request determinations. For example, in the test mode, the service authorization system 102 prospectively determines whether access requests would be allowed or denied by the current configuration of the various components (e.g., authorization policies of the computer services, etc.) if the service authorization system 102 were in enforce mode. Relatedly, the term "enforce mode" refers to a configuration of the service authorization system 102 wherein the various computer services make live determinations. For example, in the enforce mode the service authorization system 102 makes live determinations for authenticating computer services and authorization access requests. Moreover, in some implementations, the service authorization system 102 can toggle between enforce mode and test mode in a variety of different environments such as development, quality assurance, staging, etc.

In one or more embodiments, the service authorization system 102 can toggle between test and enforce mode in response to user interaction received from a user device. For example, the service authorization system 102 can initially deploy in either mode and, in response to receiving a user interaction indicating to start the test mode or the enforce mode, the service authorization system 102 can deploy the indicated mode. Furthermore, in one or more implementations, the service authorization system 102 determines allowed and/or denied access requests while in enforce mode or prospective allowed and/or denied access requests while in test mode.

As illustrated in FIG. 6A, in some embodiments, the service authorization system 102 can generate a test mode results interface 602 to display test mode results 604 of the service authorization system 102 on a user device 600. Indeed, in some implementations, the service authorization system 102 generates test mode results 604 which can include test mode decisions (e.g., in the form of a bar graph as shown in FIG. 6A). Additionally, the service authorization system 102 can generate the test mode results 604 to include information for total decisions made (e.g., in the form of a donut chart as shown in FIG. 6A).

As additionally shown in FIG. 6B, in one or more embodiments, the service authorization system 102 can generate an enforce mode results interface 606 to display enforce mode results 608 of the service authorization system 102 on the user device 600. Indeed, in one or more implementations, the service authorization system 102 generates enforce mode results 608 which can include enforce mode decisions (e.g., in the form of a bar graph as shown in FIG. 6B). Additionally, the service authorization system 102 can generate the enforce mode results 608 to include information for total decisions made (e.g., in the form of a donut chart as shown in FIG. 6B).

Figure 7:
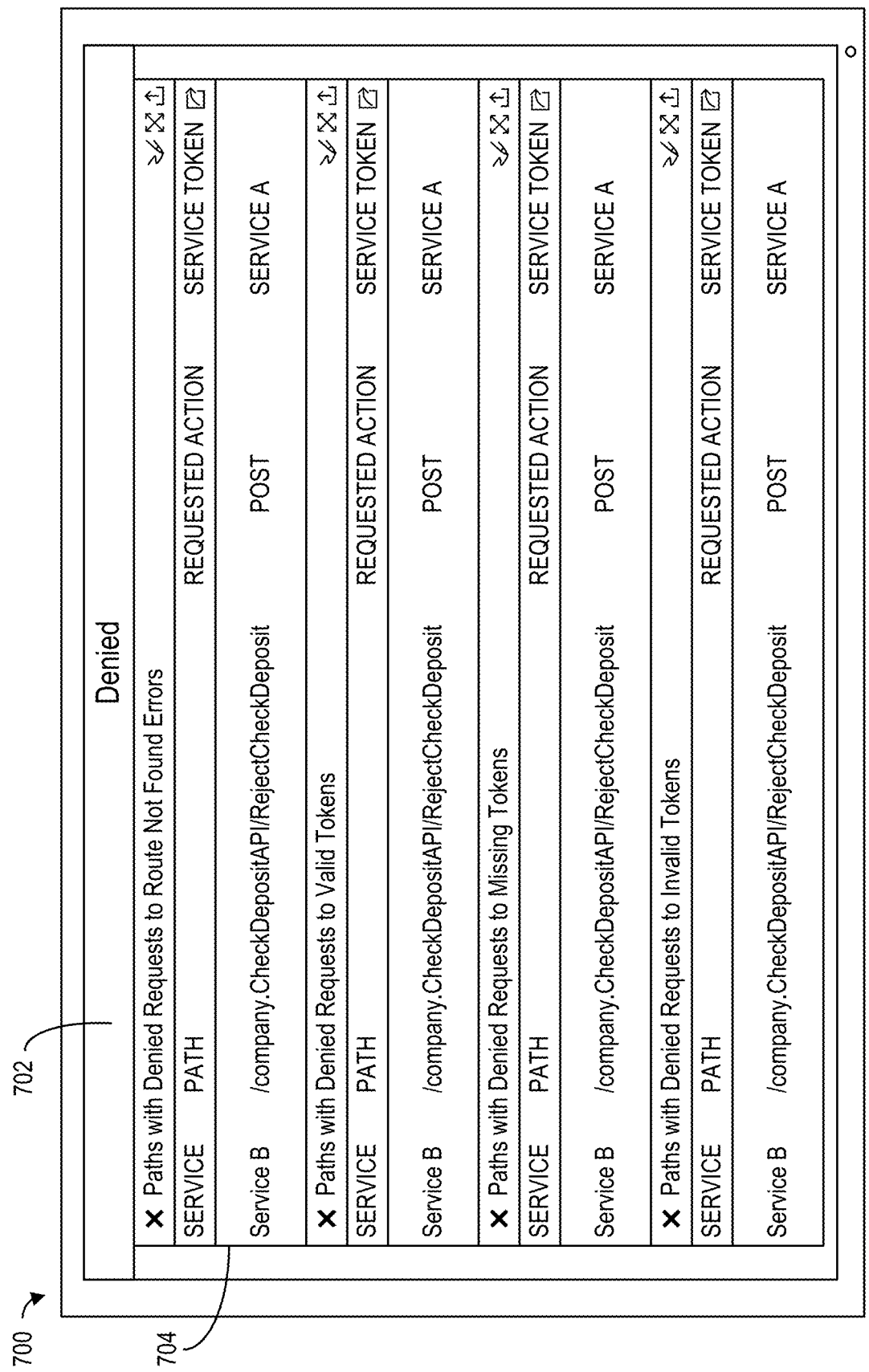
FIG. 7 illustrates an example decision report interface displaying an access request decision report in accordance with one or more embodiments.

As noted above, in some embodiments, the service authorization system 102 generates a decision report including information regarding the access requests received by a computer service. For example, in some implementations, the service authorization system 102 generates a decision report including decisions for each access request received by a computer service. FIG. 7 illustrates an example decision report interface displaying an access request decision report in accordance with one or more embodiments.

As shown in FIG. 7, in one or more embodiments, the service authorization system 102 generates a decision report 704 for display on a user device 700 via a decision report interface 702. For example, the service authorization system 102 generates the decision report 704 in response to allowing and/or denying access requests to the computer service. As used herein, the term "decision report" refers to a report detailing decisions for access requests to a computer service. For example, the decision report can include an allowed portion for allowed access requests and a denied portion for denied access requests. Additionally, the decision report can include information for the access requests, whether allowed or denied, and corresponding authorization policies such as paths, requested and/or allowed actions, computer services and/or allowed services, information regarding environments in which the access requests originated, etc. Further, the service authorization system 102 can generate the decision report for the test mode and/or the enforce mode.

As further illustrated in FIG. 7, in one or more implementations, the service authorization system 102 generates a denied portion of the decision report 704 to include reasons for denying the denied access requests. In particular, reasons for denying access requests can include various errors. For instance, the service authorization system 102 can generate the denied portion of the decision report 704 to include a header and information of access requests denied based on a route not found error. To illustrate, the service authorization system 102 can generate the denied portion of the decision report 704 to include the header "Paths with Denied Requests to Route Not Found Errors" and information of access requests denied based on the route not found error beneath this header. In some embodiments, the service authorization system 102 denies an access request based on a route not found error when the access request includes a path that the service authorization system 102 cannot match to any of the paths in the authorization policy of the receiving computer service.

As also depicted in FIG. 7, in some implementations, the service authorization system 102 can generate the denied portion of the decision report 704 to include a header and denied access requests for various other errors in a similar fashion as described in the previous paragraph. For example, for each of a valid token but invalid caller error, a missing token error, or an invalid token error, the service authorization system 102 can generate headers including "Paths with Denied Requests to Valid Tokens," "Paths with Denied Requests to Missing Tokens," and "Paths with Denied Requests to Invalid tokens," respectively.

In one or more embodiments, the service authorization system 102 denies an access request based on a valid token but invalid caller error when the service authorization system 102 determines that the computer service generating the access request does not match any of the allowed services for the path. Moreover, in one or more implementations, the service authorization system 102 denies an access request based on a missing token error when the service authorization system 102 determines that the access request lacks a third-party identification token. Furthermore, in some embodiments, the service authorization system 102 denies an access request based on an invalid token error when the service authorization system 102 determines that the third-party identification token lacks validity for various reasons. In some implementations, such reasons include the service authorization system 102 determining that the third-party identification token is expired, that the third-party identification token is not signed, that the third-party identification token lacks an authentic signature, etc.

Additionally, in one or more embodiments, the service authorization system 102 can generate an allowed portion of the decision report 704 to include information for the allowed access requests. For example, the service authorization system 102 can generate the allowed portion of the decision report to include information for the allowed access requests and corresponding authorization policies such as paths, requested and/or allowed actions, computer services and/or allowed services, information regarding environments in which the access requests originated, etc.

As mentioned previously, in one or more implementations, the service authorization system 102 generates communication tools for displaying information regarding the access request responses and/or decisions of the various computer services within the computer system environment.

Figure 8:
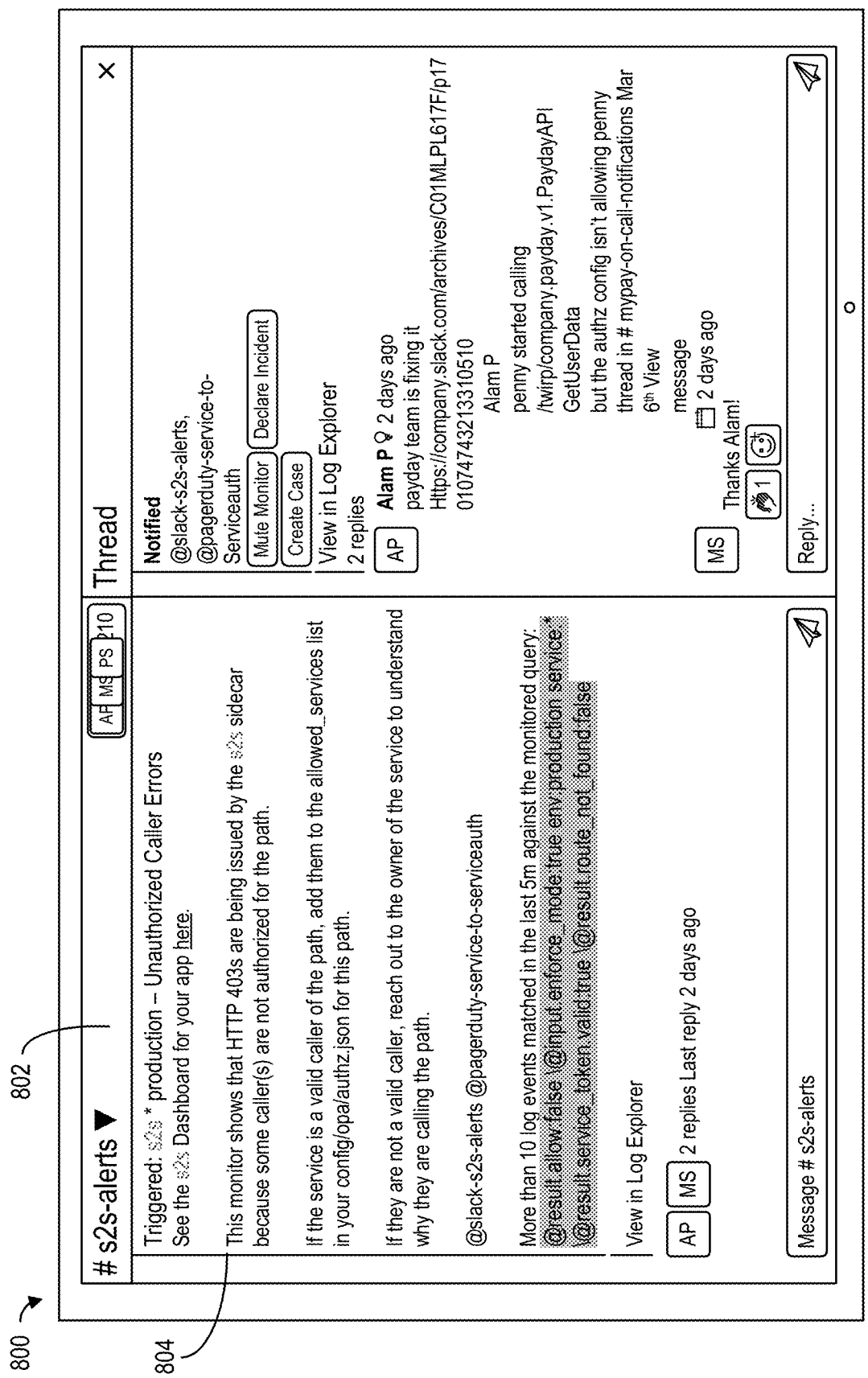
FIG. 8 illustrates an example communication interface for displaying access request response information in accordance with one or more embodiments.

FIG. 8 illustrates an example communication interface for displaying access request response information in accordance with one or more embodiments.

As portrayed in FIG. 8, in some embodiments, the service authorization system 102 generates a communication tool for display via a communication interface 802 of a user device 800. Indeed, the service authorization system 102 can generate communication tools for displaying and organizing information and conversations regarding access request decisions (e.g., denials) and related information. For example, the service authorization system 102 can generate one or more communication tools including features such as instant messaging, file sharing, and integration with various internal and external software. Specifically, in some implementations, the service authorization system 102 can generate a slack channel 804 for displaying information regarding the access request responses and/or decisions.

In one or more embodiments, the service authorization system 102 can generate alerts within the slack channel 804 for displaying information regarding the access request responses and/or decisions. For example, an alert can include information regarding an access request such as reasons (e.g., specific errors) for denying an access request, the requesting computer service (i.e., the computer service that generates the access request) and/or receiving computer service, etc. Further, in one or more implementations, the service authorization system 102 can generate the alerts to include instructions for addressing denied access requests, links to various related software programs, communication threads associated with the alerts, etc. Moreover, in some embodiments, the service authorization system 102 utilizes the slack channel and alerts to notify the individual computer services within the computer system environment of the alerts.

Furthermore, in some implementations, the service authorization system 102 can generate the information and elements of the graphical user interfaces (i.e., the test mode results interface 602, the enforce mode results interface 606, and the decision report interface 702) discussed in connection with FIGS. 6A-7 within either separate user interfaces, as discussed above, or together in a single graphical user interface. This flexibility allows the service authorization system 102 to generate the information and graphical user elements according to various different operating environments. For instance, by providing the various information and elements discussed above in a single user interface, the service authorization system 102 can simplify navigation and reduce user interactions.

FIGS. 1-8, the corresponding text, and the examples provide a number of different systems, methods, and non-transitory computer readable media for processing access requests on a service-to-service basis using a third-party identification token and computer service-specific authorization policies. In addition to the foregoing, embodiments can also be described in terms of flowcharts comprising acts for accomplishing a particular result. For example, FIG. 9 illustrates a flowchart of an example sequence of acts in accordance with one or more embodiments.

Figure 9:
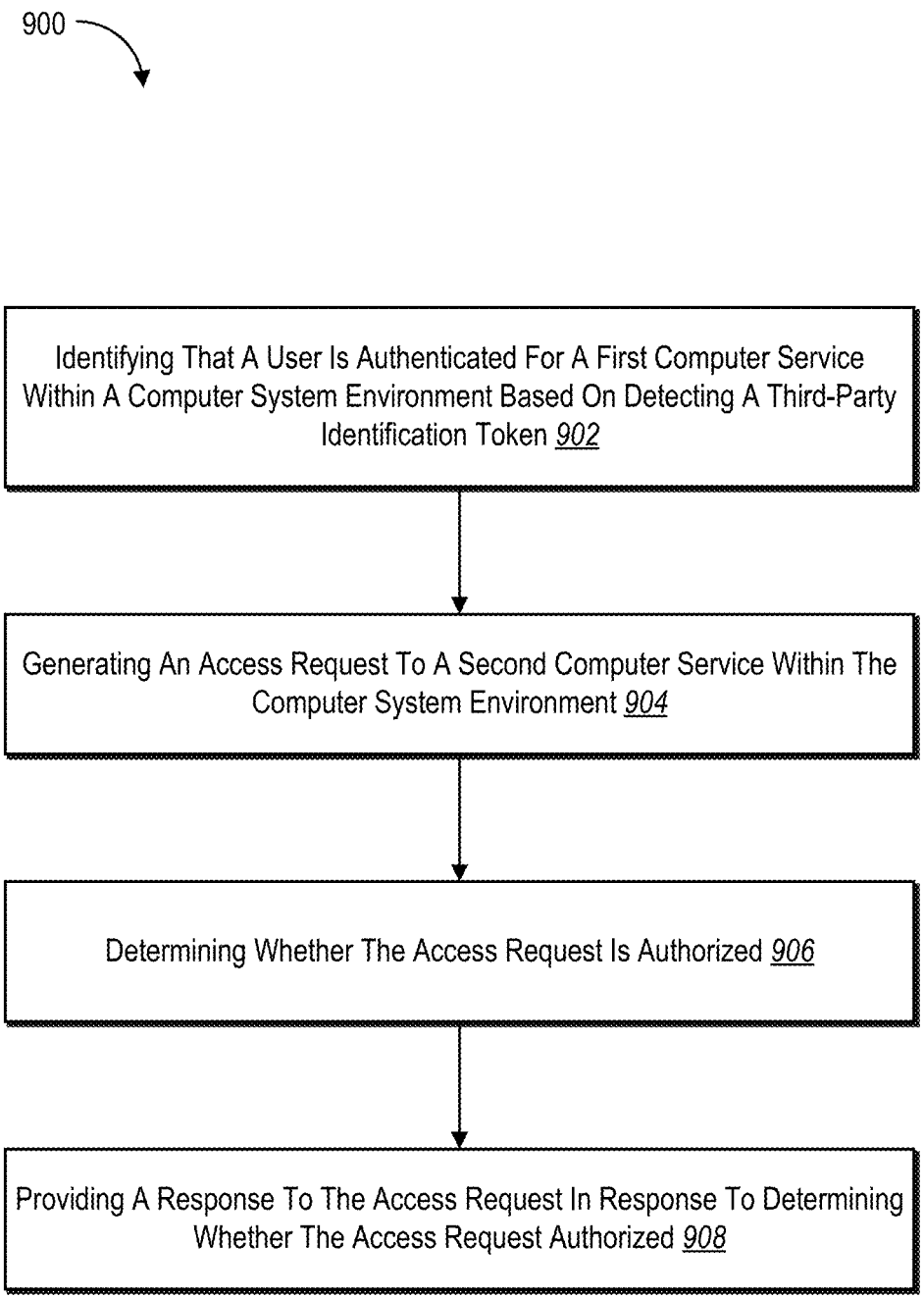
FIG. 9 illustrates an example series of acts for processing access requests on a service-to-service basis using a third-party identification token in accordance with one or more embodiments.

While FIG. 9 illustrates acts according to some embodiments, alternative embodiments may omit, add to, reorder, and/or modify any of the acts shown in FIG. 9. The acts of FIG. 9 can be performed as part of a method. Alternatively, a non-transitory computer readable medium can comprise instructions, that when executed by one or more processors, cause a computing device to perform the acts of FIG. 9. In still further embodiments, a system can perform the acts of FIG. 9. Additionally, the acts described herein may be repeated or performed in parallel with one another or in parallel with different instances of the same or other similar acts.

FIG. 9 illustrates an example series of acts 900 for processing access requests on a service-to-service basis using a third-party identification token and computer service-specific authorization policies. The series of acts 900 can include an act 902 of identifying that a user is authenticated for a first computer service within a computer system environment based on detecting a third-party identification token; an act 904 of generating an access request to a second computer service within the computer system environment; an act 906 of determining whether the access request is authorized; and an act 908 of providing a response to the access request in response to determining whether the access request is authorized.

In some embodiments, the series of acts 900 can include identifying that a user is authenticated for a first computer service within a computer system environment based on detecting a third-party identification token. The series of acts 900 can also include an act of generating, by the first computer service, an access request to a second computer service within the computer system environment, the access request including a requested action and the third-party identification token. The series of acts 900 can further include an act of determining, by the second computer service, whether the access request is authorized based on determining an authorization policy defined at the second computer service authorizes the requested action by the first computer service. Additionally, the series of acts 900 can include an act of the third-party identification token is valid. The series of acts 900 can also include an act of providing, by the second computer service to the first computer service, a response to the access request in response to determining whether the access request is authorized.

In some implementations, determining, by the second computer service, whether the access request is authorized includes determining authorization of the access request without determining a permission scope for the user.

In one or more embodiments, determining the authorization policy defined at the second computer service authorizes the requested action by the first computer service includes determining that the requested action matches an allowed action within the authorization policy. The series of acts 900 can further include an act of determining one or more allowed services for the allowed action. Additionally, the series of acts 900 can include an act of determining that the first computer service is one of the one or more allowed services.

In one or more implementations, the series of acts 900 can include performing, in response to determining that the access request is authorized, the requested action on the second computer service. The series of acts 900 can also include an act of generating, by the second computer service, the response to the access request.

In some embodiments, providing the response to the access request to the first computer service includes providing, in response to determining that the access request is not authorized, a denial response to the first computer service.

In some implementations, the series of acts 900 can include receiving a user interaction indicating to start test mode. The series of acts 900 can further include an act of determining, while in test mode, one or more prospective denied access requests and one or more prospective allowed access requests.

In one or more embodiments, the series of acts 900 can include generating, in response to denying one or more access requests, a decision report including one or more reasons for denying the one or more access requests.

Embodiments of the present disclosure may comprise or utilize a special purpose or general-purpose computer including computer hardware, such as, for example, one or more processors and system memory, as discussed in greater detail below. Implementations within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, implementations of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium.

Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some implementations, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Implementations of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 10:
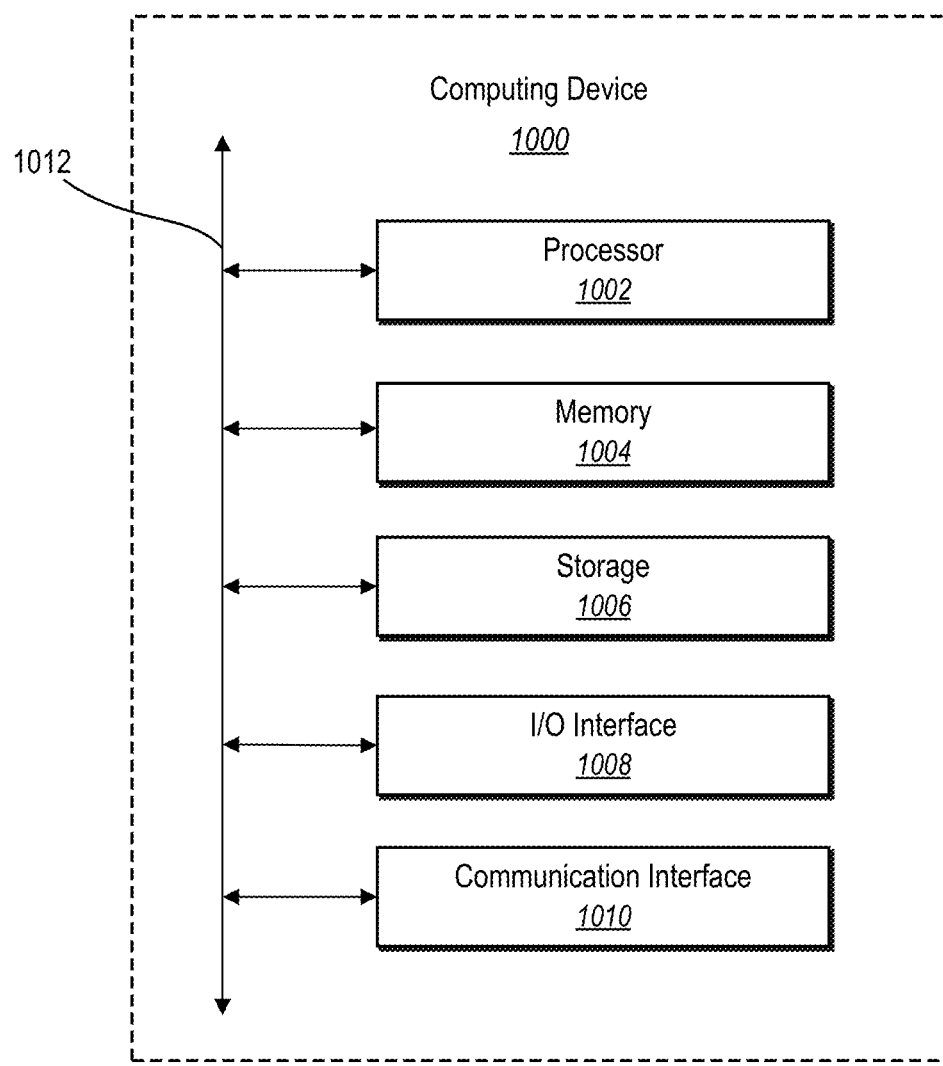
FIG. 10 illustrates a block diagram of an example computing device for implementing one or more embodiments of the present disclosure.

FIG. 10 illustrates a block diagram of exemplary computing device 1000 (e.g., the server(s) 106 and/or the user device(s) 110) that may be configured to perform one or more of the processes described above. One will appreciate that server(s) 106 and/or the user device(s) 110 may comprise one or more computing devices such as computing device 1000. As shown by FIG. 10, computing device 1000 can comprise processor 1002, memory 1004, storage device 1006, I/O interface 1008, and communication interface 1010, which may be communicatively coupled by way of communication infrastructure 1012. While an exemplary computing device 1000 is shown in FIG. 10, the components illustrated in FIG. 10 are not intended to be limiting. Additional or alternative components may be used in other implementations. Furthermore, in certain implementations, computing device 1000 can include fewer components than those shown in FIG. 10. Components of computing device 1000 shown in FIG. 10 will now be described in additional detail.

In particular implementations, processor 1002 includes hardware for executing instructions, such as those making up a computer program. As an example and not by way of limitation, to execute instructions, processor 1002 may retrieve (or fetch) the instructions from an internal register, an internal cache, memory 1004, or storage device 1006 and decode and execute them. In particular implementations, processor 1002 may include one or more internal caches for data, instructions, or addresses. As an example and not by way of limitation, processor 1002 may include one or more instruction caches, one or more data caches, and one or more translation lookaside buffers (TLBs). Instructions in the instruction caches may be copies of instructions in memory 1004 or storage device 1006.

Memory 1004 may be used for storing data, metadata, and programs for execution by the processor(s). Memory 1004 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 1004 may be internal or distributed memory.

Storage device 1006 includes storage for storing data or instructions. As an example and not by way of limitation, storage device 1006 can comprise a non-transitory storage medium described above. Storage device 1006 may include a hard disk drive (HDD), a floppy disk drive, flash memory, an optical disc, a magneto-optical disc, magnetic tape, or a Universal Serial Bus (USB) drive or a combination of two or more of these. Storage device 1006 may include removable or non-removable (or fixed) media, where appropriate. Storage device 1006 may be internal or external to computing device 1000. In particular implementations, storage device 1006 is non-volatile, solid-state memory. In other implementations, Storage device 1006 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

I/O interface 1008 allows a user to provide input to, receive output from, and otherwise transfer data to and receive data from computing device 1000. I/O interface 1008 may include a mouse, a keypad or a keyboard, a touch screen, a camera, an optical scanner, network interface, modem, other known I/O devices or a combination of such I/O interfaces. I/O interface 1008 may include one or more devices for presenting output to a user, including, but not limited to, a graphics engine, a display (e.g., a display screen), one or more output drivers (e.g., display drivers), one or more audio speakers, and one or more audio drivers. In certain implementations, I/O interface 1008 is configured to provide graphical data to a display for presentation to a user. The graphical data may be representative of one or more graphical user interfaces and/or any other graphical content as may serve a particular implementation.

Communication interface 1010 can include hardware, software, or both. In any event, communication interface 1010 can provide one or more interfaces for communication (such as, for example, packet-based communication) between computing device 1000 and one or more other computing devices or networks. As an example and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI.

Additionally or alternatively, communication interface 1010 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, communication interface 1010 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, communication interface 1010 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

Communication infrastructure 1012 may include hardware, software, or both that couples components of computing device 1000 to each other. As an example and not by way of limitation, communication infrastructure 1012 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

Figure 11:
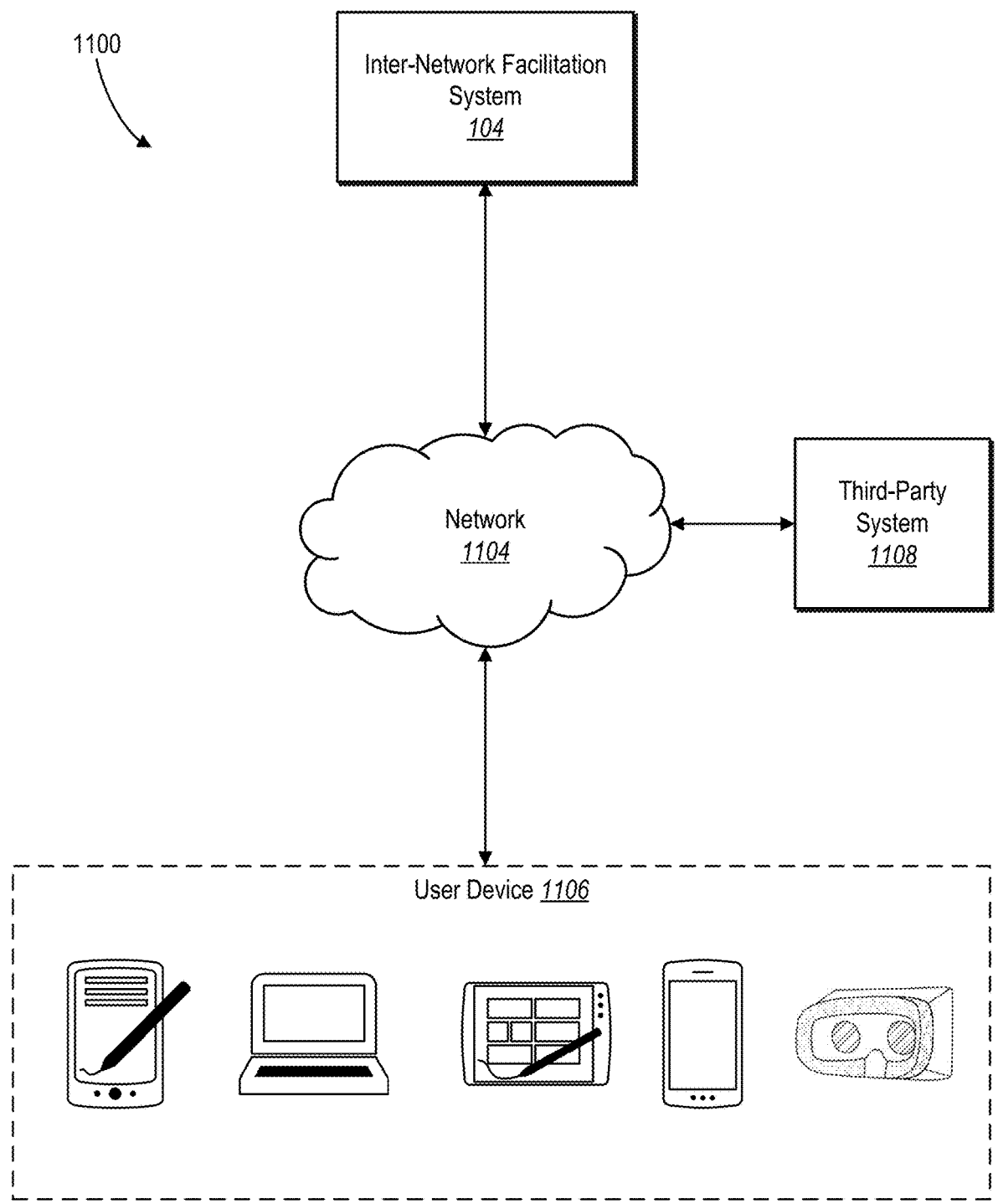
FIG. 11 illustrates an example environment for an inter-network facilitation system in accordance with one or more embodiments.

FIG. 11 illustrates an example network environment 1100 of the inter-network facilitation system 104. The network environment 1100 includes a user device 1106 (e.g., user device(s) 110), an inter-network facilitation system 104, and a third-party system 1108 connected to each other by a network 1104. Although FIG. 11 illustrates a particular arrangement of the user device 1106, the inter-network facilitation system 104, the third-party system 1108, and the network 1104, this disclosure contemplates any suitable arrangement of user device 1106, the inter-network facilitation system 104, the third-party system 1108, and the network 1104. As an example, and not by way of limitation, two or more of user device 1106, the inter-network facilitation system 104, and the third-party system 1108 communicate directly, bypassing network 1104. As another example, two or more of user device 1106, the inter-network facilitation system 104, and the third-party system 1108 may be physically or logically co-located with each other in whole or in part.

Moreover, although FIG. 11 illustrates a particular number of user devices 1106, inter-network facilitation system 104, third-party systems 1108, and networks 1104, this disclosure contemplates any suitable number of user devices 1106, FIG. 11, third-party systems 1108, and networks 1104. As an example, and not by way of limitation, network environment 1100 may include multiple user devices 1106, inter-network facilitation system 104, third-party systems 1108, and/or networks 1104.

This disclosure contemplates any suitable network 1104. As an example, and not by way of limitation, one or more portions of network 1104 may include an ad hoc network, an intranet, an extranet, a virtual private network ("VPN"), a local area network ("LAN"), a wireless LAN ("WLAN"), a wide area network ("WAN"), a wireless WAN ("WWAN"), a metropolitan area network ("MAN"), a portion of the Internet, a portion of the Public Switched Telephone Network ("PSTN"), a cellular telephone network, or a combination of two or more of these. Network 1104 may include one or more networks 1104.

Links may connect user device 1106, inter-network facilitation system 104 (e.g., which hosts the service authorization system 102), and third-party system 1108 to network 1104 or to each other. This disclosure contemplates any suitable links. In particular embodiments, one or more links include one or more wireline (such as for example Digital Subscriber Line ("DSL") or Data Over Cable Service Interface Specification ("DOCSIS"), wireless (such as for example Wi-Fi or Worldwide Interoperability for Microwave Access ("WiMAX"), or optical (such as for example Synchronous Optical Network ("SONET") or Synchronous Digital Hierarchy ("SDH") links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 1100. One or more first links may differ in one or more respects from one or more second links.

In particular embodiments, the user device 1106 may be an electronic device including hardware, software, or embedded logic components or a combination of two or more such components and capable of carrying out the appropriate functionalities implemented or supported by user device 1106. As an example, and not by way of limitation, a user device 1106 may include any of the computing devices discussed above in relation to FIG. 7. A user device 1106 may enable a network user at the user device 1106 to access network 1104. A user device 1106 may enable its user to communicate with other users at other user devices 1106.

In particular embodiments, the user device 1106 may include a requester application or a web browser, such as MICROSOFT INTERNET EXPLORER, GOOGLE CHROME, or MOZILLA FIREFOX, and may have one or more add-ons, plug-ins, or other extensions, such as TOOLBAR or YAHOO TOOLBAR. A user at the user device 1106 may enter a Uniform Resource Locator ("URL") or other address directing the web browser to a particular server (such as server), and the web browser may generate a Hyper Text Transfer Protocol ("HTTP") request and communicate the HTTP request to server. The server may accept the HTTP request and communicate to the user device 1106 one or more Hyper Text Markup Language ("HTML") files responsive to the HTTP request. The user device 1106 may render a webpage based on the HTML files from the server for presentation to the user. This disclosure contemplates any suitable webpage files. As an example, and not by way of limitation, webpages may render from HTML files, Extensible Hyper Text Markup Language ("XHTML") files, or Extensible Markup Language ("XML") files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, inter-network facilitation system 104 may be a network-addressable computing system that can interface between two or more computing networks or servers associated with different entities such as financial institutions (e.g., banks, credit processing systems, ATM systems, or others). In particular, the inter-network facilitation system 104 can send and receive network communications (e.g., via the network 1104) to link the third-party-system 1108. For example, the inter-network facilitation system 104 may receive authentication credentials from a user to link a third-party system 1108 such as an online bank account, credit account, debit account, or other financial account to a user account within the inter-network facilitation system 104. The inter-network facilitation system 104 can subsequently communicate with the third-party system 1108 to detect or identify balances, transactions, withdrawal, transfers, deposits, credits, debits, or other transaction types associated with the third-party system 1108. The inter-network facilitation system 104 can further provide the aforementioned or other financial information associated with the third-party system 1108 for display via the user device 1106. In some cases, the inter-network facilitation system 104 links more than one third-party system 1108, receiving account information for accounts associated with each respective third-party system 1108 and performing operations or transactions between the different systems via authorized network connections.

In particular embodiments, the inter-network facilitation system 104 may interface between an online banking system and a credit processing system via the network 1104. For example, the inter-network facilitation system 104 can provide access to a bank account of a third-party system 1108 and linked to a user account within the inter-network facilitation system 104. Indeed, the inter-network facilitation system 104 can facilitate access to, and transactions to and from, the bank account of the third-party system 1108 via a user application of the inter-network facilitation system 104 on the user device 1106. The inter-network facilitation system 104 can also communicate with a credit processing system, an ATM system, and/or other financial systems (e.g., via the network 1104) to authorize and process credit charges to a credit account, perform ATM transactions, perform transfers (or other transactions) across accounts of different third-party systems 1108, and to present corresponding information via the user device 1106.

In particular embodiments, the inter-network facilitation system 104 includes a model for approving or denying transactions. For example, the inter-network facilitation system 104 includes a transaction approval machine learning model that is trained based on training data such as user account information (e.g., name, age, location, and/or income), account information (e.g., current balance, average balance, maximum balance, and/or minimum balance), credit usage, and/or other transaction history. Based on one or more of these data (from the inter-network facilitation system 104 and/or one or more third-party systems 1108), the inter-network facilitation system 104 can utilize the transaction approval machine learning model to generate a prediction (e.g., a percentage likelihood) of approval or denial of a transaction (e.g., a withdrawal, a transfer, or a purchase) across one or more networked systems.

The inter-network facilitation system 104 may be accessed by the other components of network environment 1100 either directly or via network 1104. In particular embodiments, the inter-network facilitation system 104 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by the server. In particular embodiments, the inter-network facilitation system 104 may include one or more data stores. Data stores may be used to store various types of information. In particular embodiments, the information stored in data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable a user device 1106, or an inter-network facilitation system 104 to manage, retrieve, modify, add, or delete, the information stored in a data store.

In particular embodiments, the inter-network facilitation system 104 may provide users with the ability to take actions on various types of items or objects, supported by the inter-network facilitation system 104. As an example, and not by way of limitation, the items and objects may include financial institution networks for banking, credit processing, or other transactions, to which users of the inter-network facilitation system 104 may belong, computer-based applications that a user may use, transactions, interactions that a user may perform, or other suitable items or objects. A user may interact with anything that is capable of being represented in the inter-network facilitation system 104 or by an external system of a third-party system, which is separate from inter-network facilitation system 104 and coupled to the inter-network facilitation system 104 via a network 1104.

In particular embodiments, the inter-network facilitation system 104 may be capable of linking a variety of entities. As an example, and not by way of limitation, the inter-network facilitation system 104 may enable users to interact with each other or other entities, or to allow users to interact with these entities through an application programming interfaces ("API") or other communication channels.

In particular embodiments, the inter-network facilitation system 104 may include a variety of servers, sub-systems, programs, modules, logs, and data stores. In particular embodiments, the inter-network facilitation system 104 may include one or more of the following: a web server, action logger, API-request server, transaction engine, cross-institution network interface manager, notification controller, action log, third-party-content-object-exposure log, inference module, authorization/privacy server, search module, user-interface module, user-profile (e.g., provider profile or requester profile) store, connection store, third-party content store, or location store. The inter-network facilitation system 104 may also include suitable components such as network interfaces, security mechanisms, load balancers, failover servers, management-and-network-operations consoles, other suitable components, or any suitable combination thereof. In particular embodiments, the inter-network facilitation system 104 may include one or more user-profile stores for storing user profiles for transportation providers and/or transportation requesters. A user profile may include, for example, biographic information, demographic information, financial information, behavioral information, social information, or other types of descriptive information, such as interests, affinities, or location.

The web server may include a mail server or other messaging functionality for receiving and routing messages between the inter-network facilitation system 104 and one or more user devices 1106. An action logger may be used to receive communications from a web server about a user's actions on or off the inter-network facilitation system 104. In conjunction with the action log, a third-party-content-object log may be maintained of user exposures to third-party-content objects. A notification controller may provide information regarding content objects to a user device 1106. Information may be pushed to a user device 1106 as notifications, or information may be pulled from user device 1106 responsive to a request received from user device 1106. Authorization servers may be used to enforce one or more privacy settings of the users of the inter-network facilitation system 104. A privacy setting of a user determines how particular information associated with a user can be shared. The authorization server may allow users to opt in to or opt out of having their actions logged by the inter-network facilitation system 104 or shared with other systems, such as, for example, by setting appropriate privacy settings. Third-party-content-object stores may be used to store content objects received from third parties. Location stores may be used for storing location information received from user devices 1106 associated with users.

In addition, the third-party system 1108 can include one or more computing devices, servers, or sub-networks associated with internet banks, central banks, commercial banks, retail banks, credit processors, credit issuers, ATM systems, credit unions, loan associates, brokerage firms, linked to the inter-network facilitation system 104 via the network 1104. A third-party system 1108 can communicate with the inter-network facilitation system 104 to provide financial information pertaining to balances, transactions, and other information, whereupon the inter-network facilitation system 104 can provide corresponding information for display via the user device 1106. In particular embodiments, a third-party system 1108 communicates with the inter-network facilitation system 104 to update account balances, transaction histories, credit usage, and other internal information of the inter-network facilitation system 104 and/or the third-party system 1108 based on user interaction with the inter-network facilitation system 104 (e.g., via the user device 1106). Indeed, the inter-network facilitation system 104 can synchronize information across one or more third-party systems 1108 to reflect accurate account information (e.g., balances, transactions, etc.) across one or more networked systems, including instances where a transaction (e.g., a transfer) from one third-party system 1108 affects another third-party system 1108.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A computer-implemented method comprising:
identifying, based on detecting a third-party identification token issued by a third-party authentication service outside a computer system environment, that a user is authenticated for a first computer service within the computer system environment, the computer system environment comprising a microservice environment;
generating, by the first computer service, an access request to a second computer service within the computer system environment, the access request comprising a requested action and the third-party identification token;
determining, by the second computer service, whether the access request is authorized based on determining:
an authorization policy defined at the second computer service authorizes the requested action by the first computer service; and
the third-party identification token is valid; and
providing, by the second computer service to the first computer service, a response to the access request in response to determining whether the access request is authorized.

2. The computer-implemented method of claim 1, wherein determining, by the second computer service, whether the access request is authorized comprises determining authorization of the access request without determining a permission scope for the user.

3. The computer-implemented method of claim 1, wherein determining the authorization policy defined at the second computer service authorizes the requested action by the first computer service comprises:
determining that the requested action matches an allowed action within the authorization policy;
determining one or more allowed services for the allowed action; and
determining that the first computer service is one of the one or more allowed services.

4. The computer-implemented method of claim 1, further comprising:
performing, in response to determining that the access request is authorized, the requested action on the second computer service; and
generating, by the second computer service, the response to the access request.

5. The computer-implemented method of claim 1, wherein providing the response to the access request to the first computer service comprises providing, in response to determining that the access request is not authorized, a denial response to the first computer service.

6. The computer-implemented method of claim 1, further comprising:
receiving a user interaction indicating to start test mode; and
determining, while in test mode, one or more prospective denied access requests and one or more prospective allowed access requests.

7. The computer-implemented method of claim 1, further comprising generating, in response to denying one or more access requests, a decision report comprising one or more reasons for denying the one or more access requests.

8. A non-transitory computer-readable medium storing instructions that, when executed by at least one processor, cause a computing device to:
identify, based on detecting a third-party identification token issued by a third-party authentication service outside a computer system environment, that a user is authenticated for a first computer service within the computer system environment, the computer system environment comprising a microservice environment;
generate, by the first computer service, an access request to a second computer service within the computer system environment, the access request comprising a requested action and the third-party identification token;
determine, by the second computer service, whether the access request is authorized based on determining:
an authorization policy defined at the second computer service authorizes the requested action by the first computer service; and
the third-party identification token is valid; and
provide, by the second computer service to the first computer service, a response to the access request in response to determining whether the access request is authorized.

9. The non-transitory computer-readable medium of claim 8, wherein determining, by the second computer service, whether the access request is authorized comprises determining authorization of the access request without determining a permission scope for the user.

10. The non-transitory computer-readable medium of claim 8, wherein determining the authorization policy defined at the second computer service authorizes the requested action by the first computer service comprises:

determining that the requested action matches an allowed action within the authorization policy;

determining one or more allowed services for the allowed action; and determining that the first computer service is one of the one or more allowed services.

11. The non-transitory computer-readable medium of claim 8, further comprising instructions that, when executed by the at least one processor, cause the computing device to:

perform, in response to determining that the access request is authorized, the requested action on the second computer service; and generate, by the second computer service, the response to the access request.

12. The non-transitory computer-readable medium of claim 8, wherein providing the response to the access request to the first computer service comprises providing, in response to determining that the access request is not authorized, a denial response to the first computer service.

13. The non-transitory computer-readable medium of claim 8, further comprising instructions that, when executed by the at least one processor, cause the computing device to:

receive, from a user device, a user interaction indicating activation of a test mode; and determine, while in the test mode, one or more prospective denied access requests and one or more prospective allowed access requests.

14. The non-transitory computer-readable medium of claim 8, further comprising instructions that, when executed by the at least one processor, cause the computing device to generate, in response to denying one or more access requests, a decision report comprising one or more reasons for denying the one or more access requests, wherein the one or more reasons for denying the one or more access requests comprise determining that the one or more access requests have at least one of a route not found error, a valid token but invalid caller, a missing token, or an invalid token.

15. A system comprising:

at least one processor; and at least one non-transitory computer-readable storage medium storing instructions that, when executed by the at least one processor, cause the system to:

identify, based on detecting a third-party identification token issued by a third-party authentication service outside a computer system environment, that a user is authenticated for a first computer service within the computer system environment, the computer system environment comprising a microservice environment;

generate, by the first computer service, an access request to a second computer service within the computer system environment, the access request comprising a requested action and the third-party identification token;

determine, by the second computer service, whether the access request is authorized based on determining:

an authorization policy defined at the second computer service authorizes the requested action by the first computer service; and the third-party identification token is valid; and provide, by the second computer service to the first computer service, a response to the access request in response to determining whether the access request is authorized.

16. The system of claim 15, wherein determining, by the second computer service, whether the access request is authorized comprises determining authorization of the access request without determining a permission scope for the user.

17. The system of claim 15, wherein determining the authorization policy defined at the second computer service authorizes the requested action by the first computer service comprises:

determining that the requested action matches an allowed action within the authorization policy;

determining one or more allowed services for the allowed action; and determining that the first computer service is one of the one or more allowed services.

18. The system of claim 15, further comprising instructions that, when executed by the at least one processor, cause the system to:

perform, in response to determining that the access request is authorized, the requested action on the second computer service; and generate, by the second computer service, the response to the access request.

19. The system of claim 15, wherein providing the response to the access request to the first computer service comprises providing, in response to determining that the access request is not authorized, a denial response to the first computer service.

20. The system of claim 15, further comprising instructions that, when executed by the at least one processor, cause the system to:

receive, from a user device, a user interaction indicating activation of a test mode; and determine, while in the test mode, one or more prospective denied access requests and one or more prospective allowed access requests.

* * * * *